(12) United States Patent
Nelson et al.

(10) Patent No.: US 6,853,194 B2
(45) Date of Patent: Feb. 8, 2005

(54) ELECTROMAGNETIC TARGET DISCRIMINATOR SENSOR SYSTEM AND METHOD FOR DETECTING AND IDENTIFYING METAL TARGETS

(75) Inventors: Carl V. Nelson, Rockville, MD (US); Dexter G. Smith, Columbia, MD (US)

(73) Assignee: The Johns Hopkins University, Baltimore, MD (US)

( * ) Notice: Subject to any disclaimer, the term of this patent is extended or adjusted under 35 U.S.C. 154(b) by 250 days.

(21) Appl. No.: 10/181,471

(22) PCT Filed: Mar. 20, 2001

(86) PCT No.: PCT/US01/08940

§ 371 (c)(1),
(2), (4) Date: Jul. 17, 2002

(87) PCT Pub. No.: WO01/71387

PCT Pub. Date: Sep. 27, 2001

(65) Prior Publication Data

US 2003/0052684 A1 Mar. 20, 2003

Related U.S. Application Data

(60) Provisional application No. 60/191,260, filed on Mar. 22, 2000.

(51) Int. Cl.[7] .................................................. G01V 3/11
(52) U.S. Cl. ........................................................ 324/329
(58) Field of Search ................................. 324/326, 329, 324/332, 334–337

(56) References Cited

U.S. PATENT DOCUMENTS 6,326,791 B1 * 12/2001 Bosnar ........................ 324/329

* cited by examiner

*Primary Examiner*—Bot LeDynh
(74) *Attorney, Agent, or Firm*—Francis A. Cooch

(57) ABSTRACT

A time-domain electromagnetic target discriminator (ETD) sensor system and method are provided capable of measuring a metal target's time decay response based on the physical parameters of the metal target and its environment and for identifying the metal target. The ETD sensor system includes a pulse transmitter connected to a receiver via a data acquisition and control system. The transmitter and receiver include coil configurations for placement in proximity to a visually obscured, e.g., buried, metal target (or underground void) for inducing eddy currents within the metal target. The ETD sensor system measures the eddy current time decay response of the metal target in order to perform target recognition and classification. The identification process entails comparing the metal target's (or, underground void or other object's) time decay response with a library of normalized object signatures, e.g., time decay responses and other characteristics.

15 Claims, 18 Drawing Sheets

SEARCH MODE

IDENTIFICATION MODE

ELECTROMAGNETIC TARGET DISCRIMINATOR SENSOR SYSTEM AND METHOD FOR DETECTING AND IDENTIFYING METAL TARGETS

STATEMENT OF GOVERNMENTAL INTEREST

This application claims the benefit of prior filed U.S. Provisional Patent Application No. 60/191,260, filed on Mar. 22, 2000.

BACKGROUND OF THE INVENTION

1. Field of the Invention

The present invention relates to detecting and identifying metal targets in general and, more particularly, to an electromagnetic target discriminator (ETD) sensor system and method for detecting and identifying metal targets, such as unexploded ordnance, high metal content landmines and low metal content landmines (commonly referred to as plastic landmines) buried in the soil (or visually obscured) based on the electromagnetic response of the target to a time-domain wide bandwidth electromagnetic spectrum.

2. Description of the Related Art

With an estimated 100 million mines and countless millions of acres of land contaminated with unexploded ordnance (UXO) worldwide there is a need for sensor systems and methods that can detect and identify large and small metal objects buried in soil. In addition, during armed conflict, there is a need for mine detection and neutralization in real-time or near real-time.

A commonly used sensor for mine and UXO detection is the electromagnetic induction (EMI) metal detector. Conventional EMI metal detectors using either frequency-domain (FD) or time-domain (TD) eddy current methods can detect small metal targets (such as plastic-cased low-metal content mines) at shallow depths and large metal targets (such as metal-cased high-metal content mines and UXOs) at both shallow and deep depths under a wide range of environmental and soil conditions. However, metal non-mine (i.e., clutter) objects commonly found in the environment pose a major problem in identifying mines. That is because these clutter objects create false alarms when detected by a metal detector. For time-efficient and cost-effective land clearing, the detected metal targets must be classified as to their threat potential: mine, UXO or clutter. Preferably, these metal targets need to be classified in real-time or near real-time.

FIG. 1 shows a diagram of a conventional pulsed EMI metal detector and method of operation. A current loop transmitter 10 is placed in the vicinity of the buried metal target 12, and a steady current flows in the transmitter 10 for a sufficiently long time to allow turn-on transients in the soil (soil eddy currents) to dissipate. The transmitter loop current is then turned off. The transmitter current is typically a pulsed waveform. For example, a square-wave, triangle or sawtooth pulsed waveform, or a combination of different positive and negative current ramps.

According to Faraday's Law, the collapsing magnetic field induces an electromotive force (emf) in nearby conductors, such as the metal target 12. This emf causes eddy currents to flow in the conductor. Because there is no energy to sustain the eddy currents, they begin to decrease with a characteristic decay time that depends on the size, shape, and electrical and magnetic properties of the conductor. The decay currents generate a secondary magnetic field that is detected by a magnetic field receiver 14 located above the ground and coupled to the transmitter 10 via a data acquisition and control system 16.

Extensive theoretical and experimental research supports the concept of metal target classification using EMI techniques. In the time-domain for a pulsed transmitter current, the eddy current time decay response from metal target can be expressed as:

$$V(t) = \delta(t) - \sum_i [A_i \exp\{-t/\tau_i\}] \quad (1)$$

where t is time, V(t) is the induced voltage in the receiver coil, $\delta(t)$ is the delta function, $A_i$ are object amplitude response coefficients, and $\tau_i$ are the object's time constants. Thus, the sensor response to a metal target is a sum of exponentials with a series of characteristic amplitudes, $A_i$, and time constants, $\tau_i$. Equation (1) and its complimentary equation, i.e., in the frequency domain, form the theoretical basis of an EMI sensor's classification technique. If a metal target is shown to have a unique time decay response, a library of potential threat targets can be developed. When a metal target is encountered in the field, its time decay response can be compared to those in the library and, if a match is found, the metal target can be classified quickly. Equation (1) can also be applied to the response of the environment, particularly the soil or water that the metal target is buried in. It is noted that Equation (1) is slightly different if the transmitter current waveform is a ramp or other time-varying signal, but the general nature of the multiple exponential target response is the same.

The detection of buried objects having a metal content has been established abundantly in the scientific and engineering literature. There still, however, remains the problem of identifying buried objects using sensor systems and object identification methodology. The identification problem for buried metal targets is divided into two categories: (1) identification of medium to large metal content objects and (2) identification of low metal content objects.

Medium to large metal content mines and UXO objects have a unique eddy current time decay (or frequency) response characteristic that enables them to be discriminated from a wide variety of typical metal clutter in a variety of soil types. Medium to large metal content mines and UXO objects have many complex three-dimensional structural features that manifest themselves in different eddy current time decay or frequency spectrum characteristics. This complex eddy current decay response must be measured very accurately over many orders of magnitude in both time and amplitude (TD sensor) or frequency, amplitude and phase (FD sensor).

Typically, the medium to large metal content mines and UXO objects can be modeled spatially as simple point magnetic dipoles and their time or frequency decay response can be modeled with one or two time decay parameters. Generally, for medium and large metal objects, the soil does not adversely effect the time decay response measurements. This is due to the fact that the soil response is typically small and/or is confined to a small time decay region.

The identification of low metal content objects is more difficult, since they do not have complex structural features that manifest themselves in different eddy current time decay or frequency spectrum characteristics as compared to medium to large metal content objects which have a more complex spatial and time decay response. In addition, the time constant of the metal decay of low metal content objects is relatively fast, requiring a wide bandwidth EMI sensor system. Also, for most environments, the effect of the soil's TD (or FD) response must be taken into account when attempting to identify low metal content objects.

U.S. Pat. Nos. 5,963,035 and 6,104,193 describe low metal content mine detection and identification systems and approaches, but do not address the eddy current decay response of the soil (or the mine's environment in general).

This is a major shortcoming since the library of target signatures must be accurately known in advance for high confidence object identification. If the soil modifies an object's decay response signature, the sensor system is probably not going to correctly identify the object using a target identification algorithm.

Once an object has been detected and target decay response data has been collected, a signal processing method is applied to the eddy current decay time response to identify the object. Prior art sensor systems do not optimize the sensor's data collection parameters for optimal target identification. These sensor parameters include transmitter field strength (i.e., current in transmitter coil), amplifier gain, sample rate of digitizer, and sample collection time. In addition, prior art sensor systems and signal processing approaches generally ignore the effects of soil on the measured target response, especially the effects of highly magnetic soils. If the soil response is not accounted for, the library of metal object signatures becomes less effective and less useful. Several prior art sensor systems also fail to take into account the non-uniform nature of their primary exciting magnetic field on the object's decay response characteristic.

Accordingly, a need exists for a sensor system for accurately measuring a metal target's decay response based on the physical parameters of the metal target and its environment and for identifying the metal target.

SUMMARY OF THE INVENTION

There is provided a time-domain electromagnetic target discriminator (ETD) sensor system and method capable of measuring a metal target's (or other target's) time decay response based on the physical parameters of the metal target and its environment and for identifying the metal target. The ETD sensor system includes a transmitter connected to a receiver via a data acquisition and control system. A pulse or other waveform current signal, such as a ramp waveform signal, is provided to the transmitter. The transmitter and receiver include coil configurations for placement in proximity to a visually obscured, e.g., buried, metal target for inducing eddy currents within the metal target. The ETD sensor system measures the eddy current time decay response of the metal target in order to perform target recognition and classification. The ETD sensor system is capable of measuring metal target decay times in a variety of metal targets starting approximately 3 to 5 $\mu s$ after transmitter current flow is turned off. The ETD sensor system is also capable of measuring target decay time constants as short as 1.4 $\mu s$.

An inventive algorithm is presented for optimizing target characterization of a visually obscured object, such as the metal target, upon detection of the visually obscured object by the ETD sensor system. The algorithm includes the steps of (a) adjusting a first parameter of the ETD sensor system and collecting a data set using the receiver; (b) analyzing the collected data set to determine at least one measurement of a time decay response corresponding to the object; and (c) adjusting a second parameter of the ETD sensor system, collecting a data set using the receiver, and returning to step (b), if the determined at least one measurement is outside a predetermined range.

Further steps include (d) estimating a decay time response constant corresponding to the object; (e) adjusting at least the first parameter based on the estimated decay time response constant; (f) collecting a plurality of data sets, including an object data set corresponding to the object and background data sets corresponding to non-object areas, using the receiver; (g) averaging the background data sets to obtain an average background data set; and (h) subtracting the average background data set from the object data set.

Additionally, the algorithm includes the steps of (i) determining a characteristic of the object's time decay response; (j) adjusting at least the second parameter and returning to step (f), if the characteristic is less than a predetermined threshold; and (k) adjusting at least the second parameter and returning to step (f), if the characteristic is greater than the predetermined threshold.

The algorithm further includes steps for classifying the visually obscured object. These steps include (l) comparing the object's time decay response with a library of normalized time decay responses each corresponding to an object; (m) identifying a time decay response from the library approximating the object's time decay response; and (n) determining the visually obscured object to be the object corresponding to the identified time decay response. The algorithm also appends the library by storing the object's time decay response within the library with a corresponding description of the object.

DETAILED DESCRIPTION OF THE PREFERRED EMBODIMENTS

Figure 1:
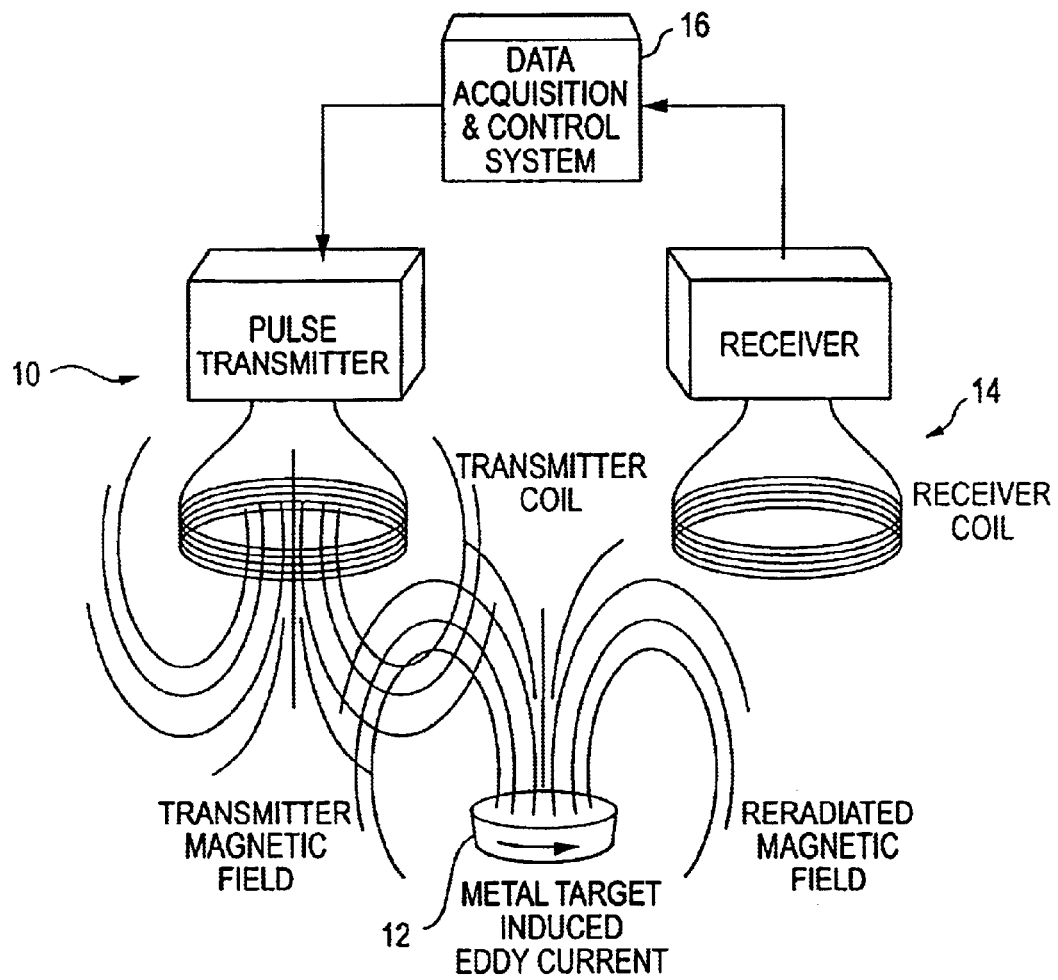
FIG. 1 is a schematic representation of a prior art pulsed EMI metal detector.
Figure 2:
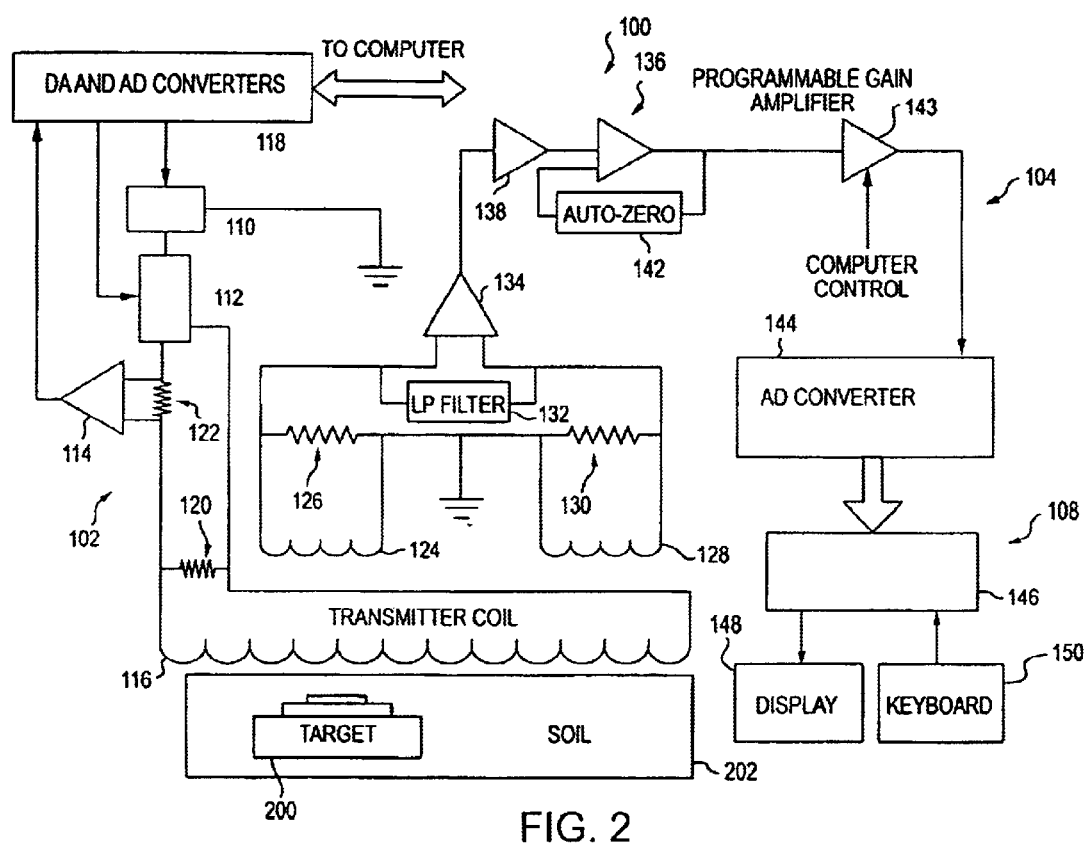
FIG. 2 is a block diagram of an electromagnetic target discriminator (ETD) sensor system according to the present invention.
Figure 3A:
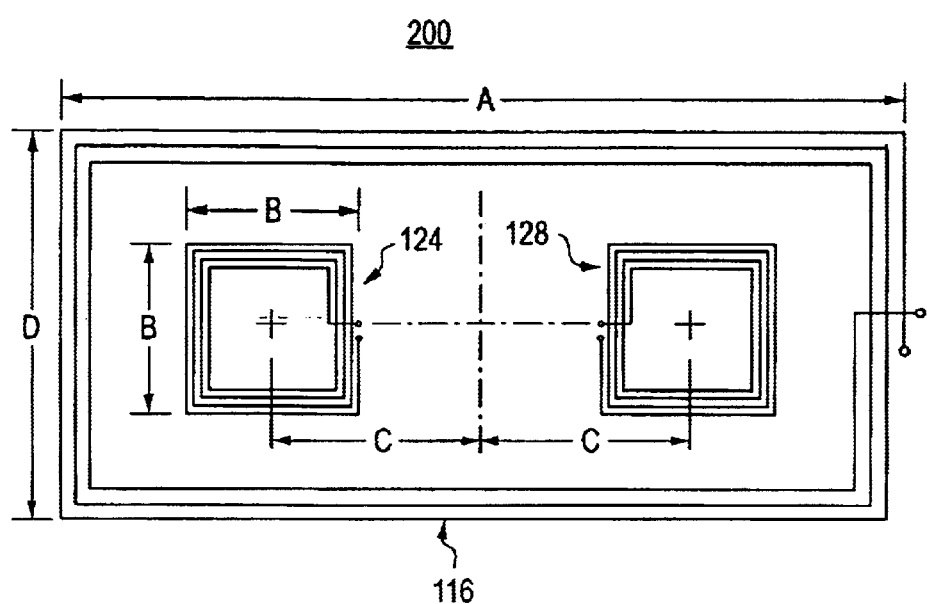
FIG. 3A is a diagram of a transmitter-receiver coil arrangement of an antenna of the ETD sensor system according to the present invention.
Figure 3B:
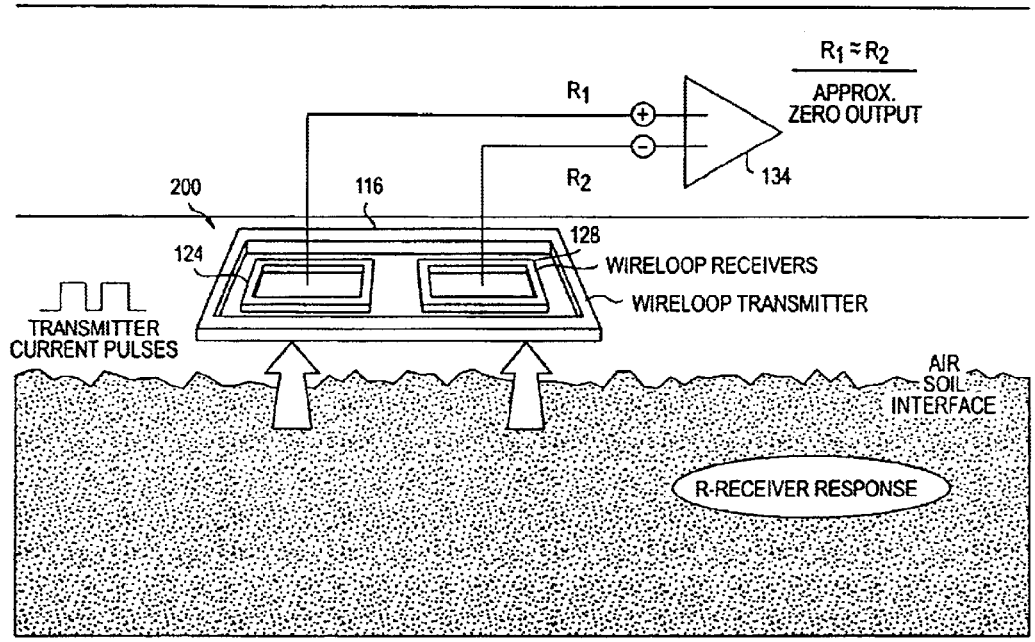
FIG. 3B is a diagram showing the antenna of the present invention over soil which does not have a metal target.
Figure 3C:
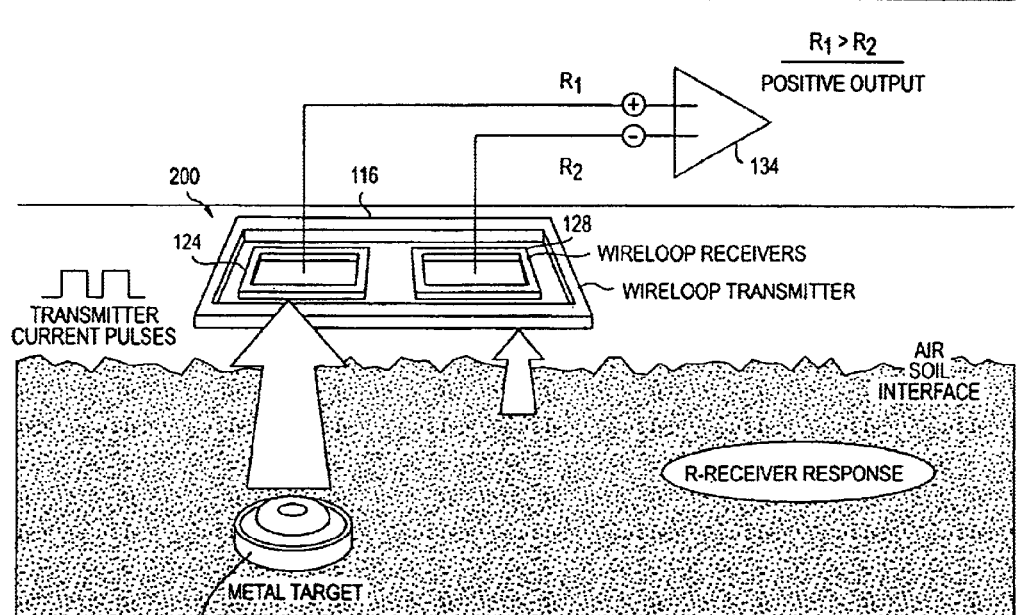
FIG. 3C is a diagram showing the antenna of the present invention over a metal target.
Figure 3D:
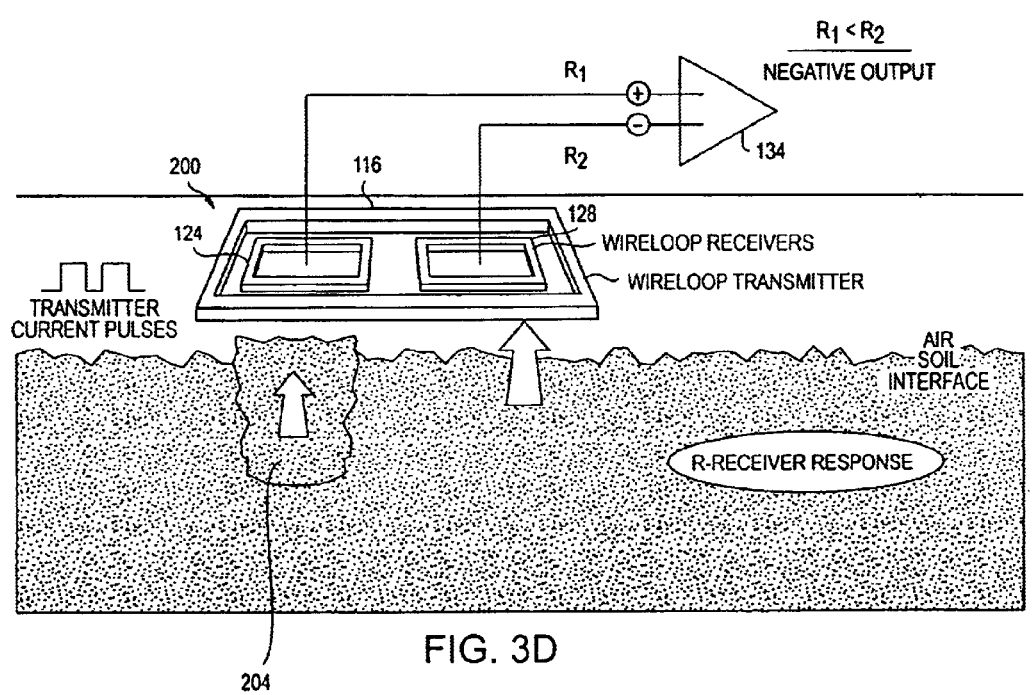
FIG. 3D is a diagram showing the antenna of the present invention over a void in the soil.
Figure 4:
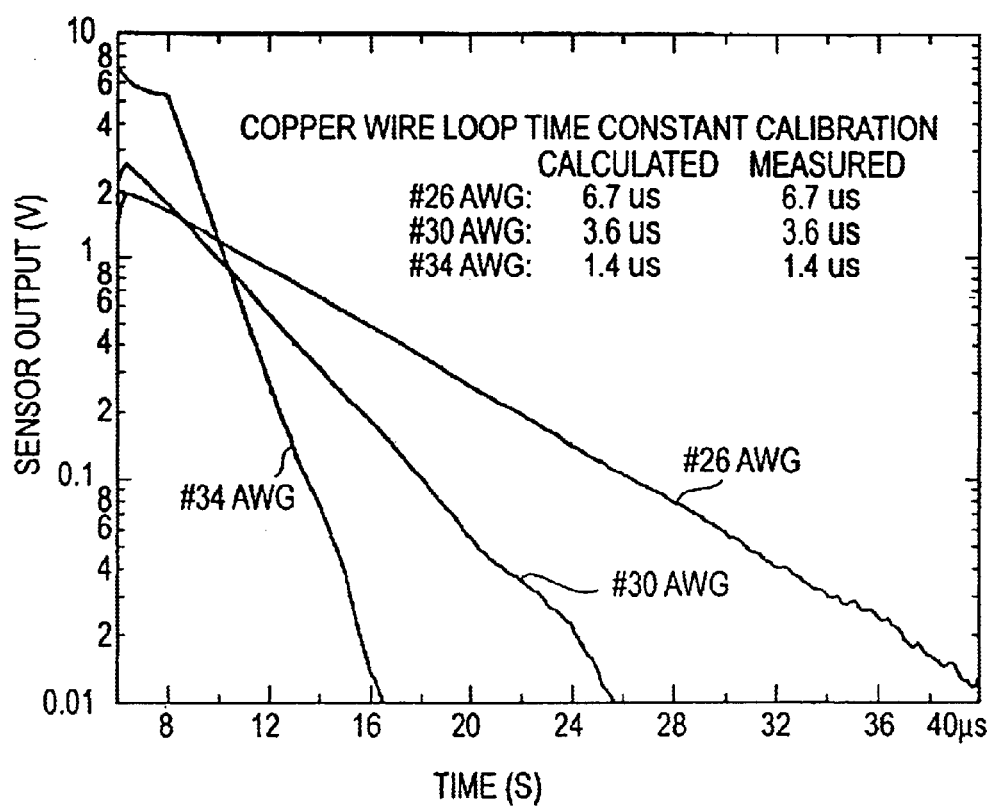
FIG. 4 is a chart showing time decay responses using different calibration loops of a small antenna of the ETD sensor system.
Figure 10:
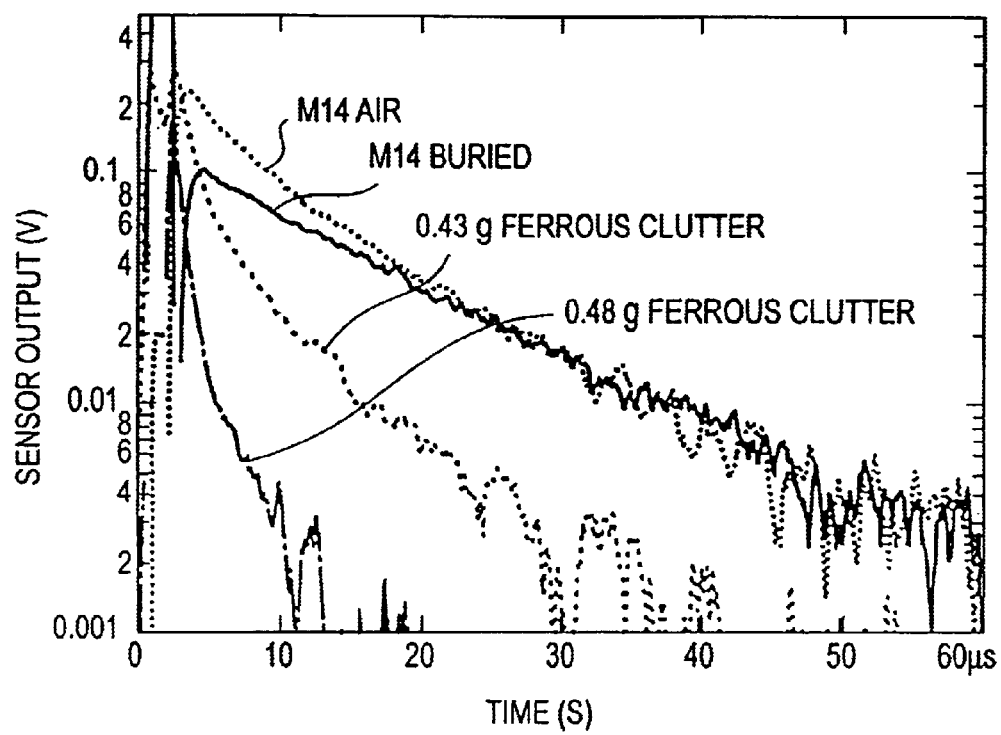
FIG. 10 is a chart showing time decay responses of a M14 AP mine buried "in air" and in soil and time decay responses of two small steel metal clutter targets measured by the small antenna of the ETD sensor system.
Figure 11:
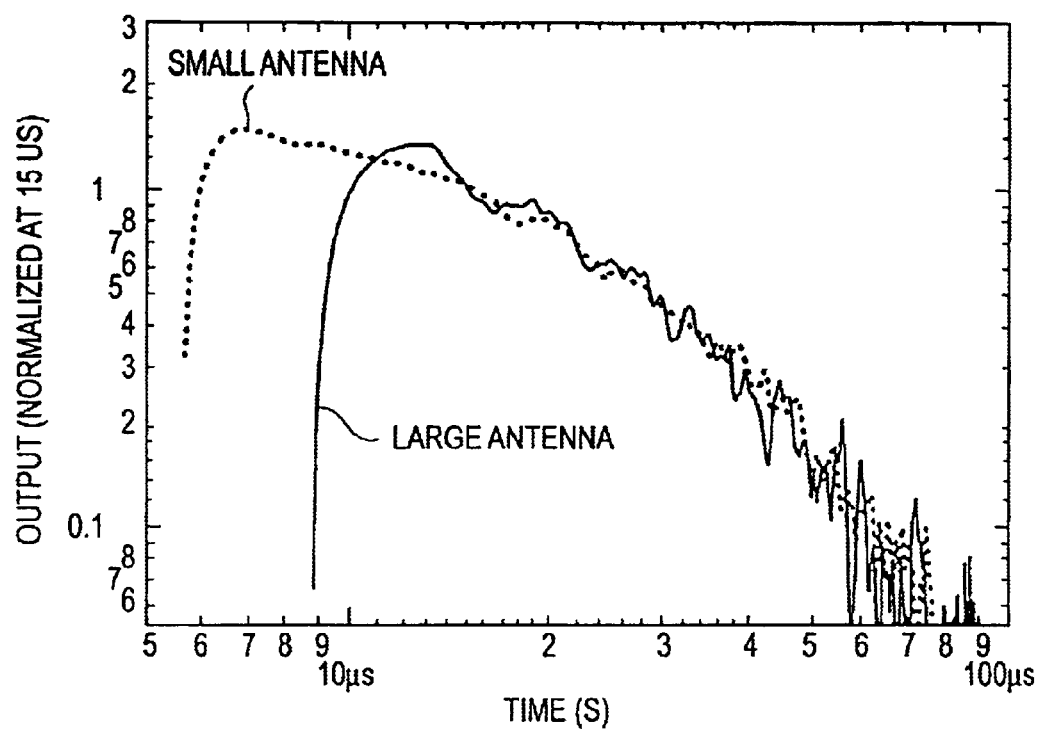
FIG. 11 is a chart comparing time decay responses of a buried PMA3 AP mine measured by the small and large antennas of the ETD sensor system.
Figure 12:
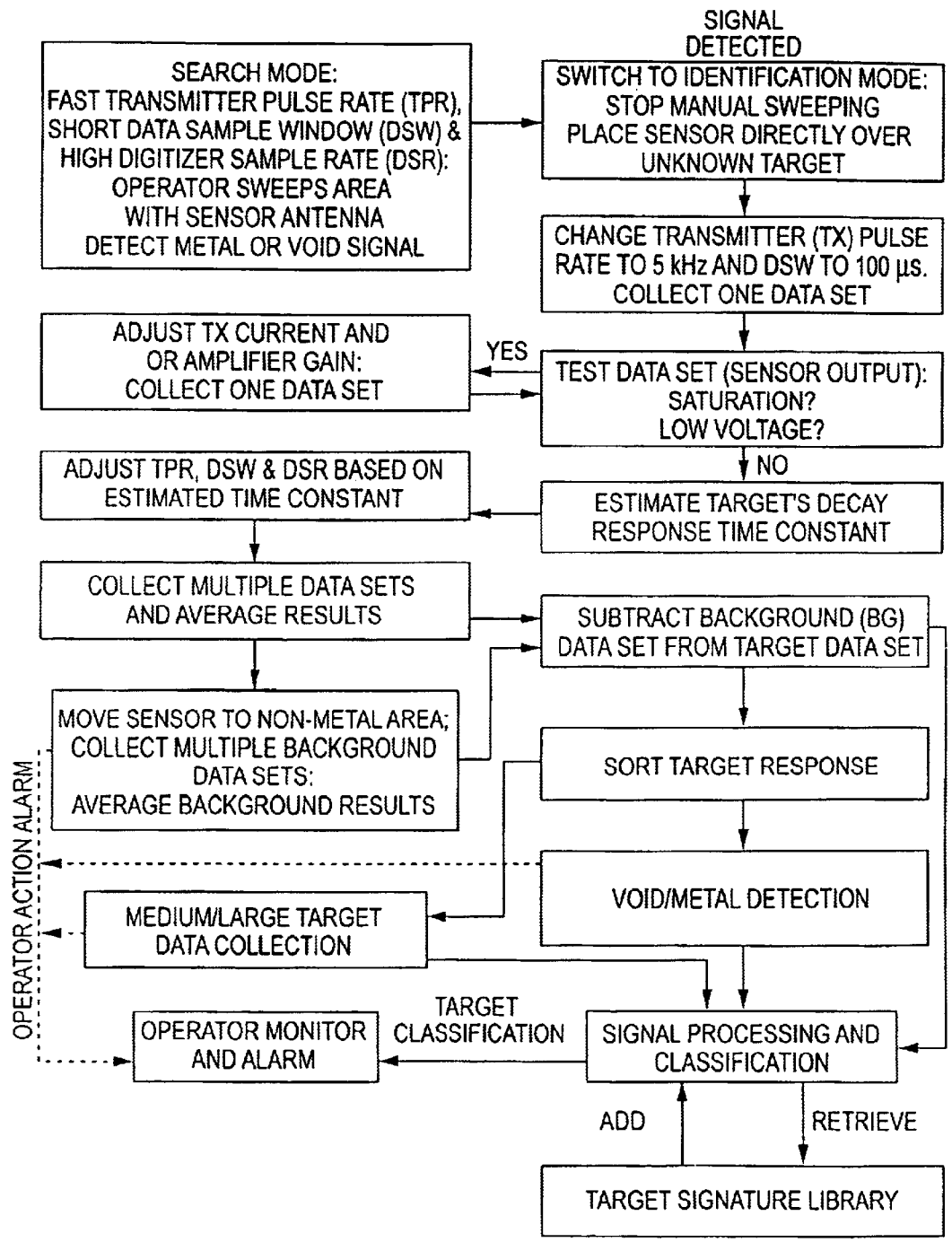
FIG. 12 is a flow chart illustrating an inventive algorithm for operating the ETD sensor system of the present invention.
Figure 13:
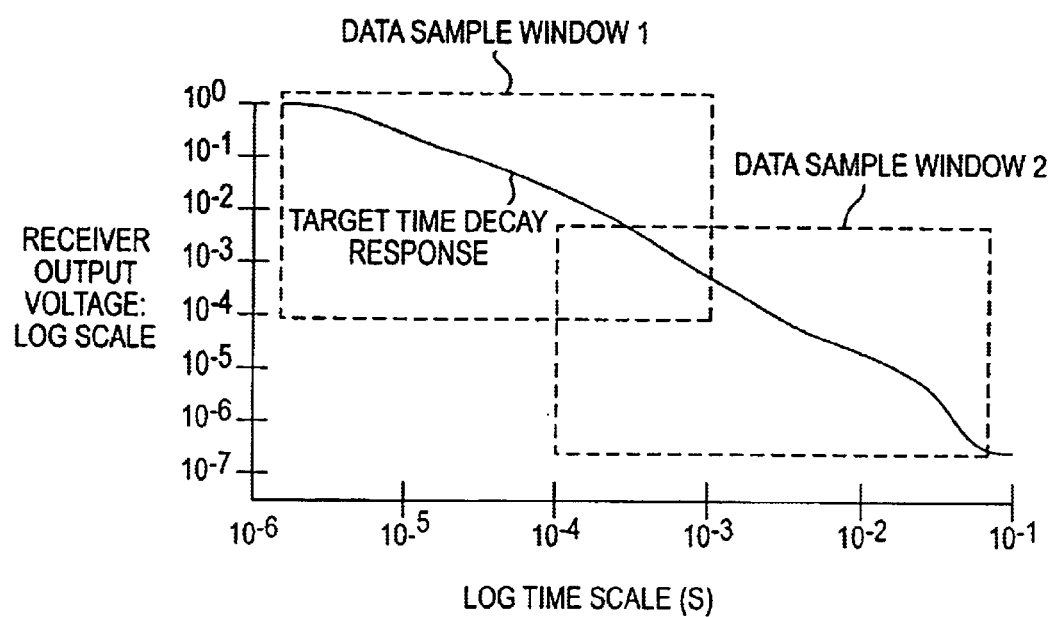
FIG. 13 is a chart illustrating multiple, overlapping data collections from a target with a complex time decay response as obtained using the ETD sensor system.
Figure 14A:
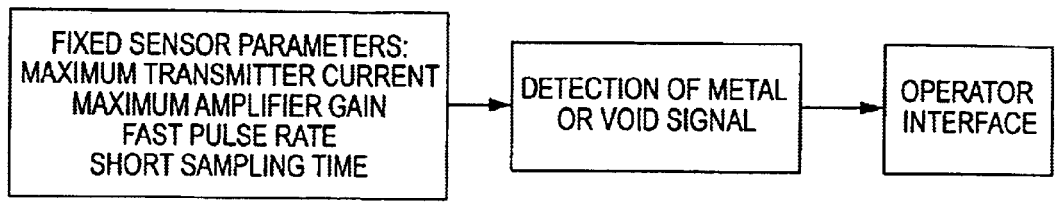
FIG. 14A is a block diagram of a search mode of the ETD sensor system.

A detailed description will now be provided of the invention in conjunction with FIGS. 2–4 (Section I) and FIGS. 12–14 (Section III) followed by a discussion of results from laboratory and field measurements in conjunction with FIGS. 5–11 (Section II).

I. ETD Sensor System

A. Electronic Design of the ETD Sensor System

Referring to FIG. 2, there is shown a block diagram of an electromagnetic target discriminator (ETD) sensor system for detecting and identifying metal targets, such as unexploded ordnance, high metal content landmines and low metal content landmines (commonly referred to as plastic landmines) buried in the soil based on the electromagnetic response of the target to a time-domain, wide bandwidth electromagnetic spectrum according to the present invention.

The ETD sensor system is designated generally by reference numeral 100 and includes a transmitter system 102, a receiver system 104, and a computer control system 108 capable of executing computer programmable instructions for performing data acquisition, data processing, control, data storage and display functions. For example, the computer control system 108 executes data acquisition programmable instructions for acquiring and analyzing data received from the transmitter system 102 and the receiver system 104. Even though the receiver system 104 is illustrated as using an induction coil, it is contemplated that the receiver system 104 can use other types of magnetic sensors.

The transmitter and receiver systems 102, 104 are used to measure a hidden/buried object's induced decaying eddy current magnetic field, i.e., time decay response, as discussed below.

The transmitter system 102 includes a computer-controlled current source 110 feeding a transmitter switch 112. The transmitter switch 112 is preferably an insulated gate, bipolar transistor (IGBT) having a high (typically 600 V or more) breakdown voltage which makes it ideal for switching highly inductive loads characteristic of multi-turn pulse-EMI transmitter coils. The transmitter system 102 further includes a current sense amplifier 114 for setting the transmitter coil current through a transmitter coil 116. Analog output signals from the current sense amplifier 114 are fed to a digital-to-analog (DA)/analog-to-digital (AD) converter system 118 where they are converted to digital signals prior to being transmitted to the computer control system 108.

The DA/AD converter system 118 includes a plurality of DA converters and AD converters for converting digital signals received from the computer control system 108 to analog signals and for converting analog signals received from the computer control system 108 to digital signals. The computer-controlled current source 110 and the transmitter switch 112 receive control signals from the computer control system 108 via the DA/AD converter system 118. A transmitter coil damping resistor 120 is mounted to the transmitter coil 116 and a current sense resistor 122 is mounted in parallel to the current sense amplifier 114. It is contemplated that the transmitter coil 116 could also be provided with current from a voltage source.

Control of the transmitter current is important for the effective operation of the EDT sensor system 100 and target classification as discussed later. The transmitter coil 116 is also constructed/configured to have a frequency response that is higher than the frequency content of the target signature. This is accomplished by configuring the transmitter coil 116 of the EDT sensor system 100 to have a bandwidth greater than 600 kHz. The damping resistor 120 critically damps the transmitter coil 116.

The receiver system 104 includes a first receiver coil 124 having a first damping resistor 126 mounted thereto and a second receiver coil 128 having a second damping resistor 130 mounted thereto. The two receiver coils 124, 128 are coupled to a low-pass filter 132 and a wide-band differential transconductance low-noise amplifier 134 having a gain of approximately 100. The purpose of the low-pass filter 132 is to remove high frequency signals that are beyond the frequency band of interest for target detection and classification.

The two receiver coils 124, 128 are configured to have identical response characteristics to the transmitter coil 116 excitation. This ensures that when the receiver coils 124, 128 are connected to the system 100, the difference signal in the absence of a target is zero or near zero. The two receiver coils 124, 128 are placed in the transmitter coil 116 in such a way that they are excited by identical magnetic fields. Again, this ensures that when the two receiver coils 124, 128 are connected to the system 100, the difference signal in the absence of a target is zero or near zero. The receiver coils 124, 128 are also configured to have a frequency response that is higher than the frequency content of the target signature. This is accomplished by configuring each of the receiver coils 124, 128 of the EDT sensor system 100 to have a bandwidth greater than 600 kHz.

Analog output signals from the low-noise amplifier 134 are fed to a differential line driver/receiver pair amplifier stage 136 having a first amplifier 138 and a second amplifier 140. The gain of the first and second amplifiers 138, 140 is approximately 10. The amplifier stage 136 further includes an auto-zero feedback circuit 142 for removing amplifier offset voltages. The overall gain of the amplification chain is 1000.

Analog output signals from the amplifier stage 136 are fed to programmable gain amplifier 143. The amplifier 143 is under control of the computer control system 108. The output signals of the amplifier 143 are transmitted to an AD converter system 144 for converting the analog output signals to digital output signals prior to being transmitted to the computer control system 108.

It is noted that the computer control system 108 is capable of controlling the amplifier stage 136 for selecting an optimal amplification gain for the amplifier stage 136 based on a particular target's time decay response signal. For example, if the target is a low metal content target, then the amplification gain of the amplifier stage 136 can be increased accordingly to adequately amplify the target's time decay response signal. It is contemplated that a time-gain amplifier commonly used in radar and ultrasonic sensors can be incorporated within the ETD sensor system 100 for further increasing the amplification gain of the system 100.

The computer control system 108 includes a processing unit 146, a display 148 and a keyboard 150 and other peripherals as known in the art. The computer control system 108 controls the pulse repetition rate, current and duty cycle of the transmitter system 102, AD converter system 144 sample data rate, and amplifier gain. A battery powers the ETD sensor system 100, such as a rechargeable lithiumion battery.

Hereinbelow, the transmitter coil 116 and the receiver coils 124, 128 are collectively referred to as an antenna.

In one embodiment, the AD converter system 144 is capable of operating at 10-Msamples/sec. At this sample rate, data are preferably collected from during 819.2 $\mu s$ to generate approximately 8192 data values. If the number of data scans is set to a number greater than one using the computer control system 108, the processing unit 146 commands the AD converter system 144 to collect additional data until the preset number of data scans is reached. For scans greater than one, the processing unit 146 stacks the data in a one-dimensional data array, such as a DRAM, forming an ensemble average. After the preset number of data scans is reached using the antenna, the averaged data are plotted as voltage versus time on the display 148 for the operator to view. Data are preferably saved to a storage medium for transfer to a personal computer or other computing device for analysis and archiving.

The data can also be analyzed by the processing unit 146 in real-time for real-time target identification. Accordingly, the processing unit 146 informs the operator in real-time as to the target's identity.

B. Transmitter and Receiver Coil (Antenna) Design

Two antennas are disclosed herein for use with the ETD sensor system 100 of the present invention in order to acquire data for measuring the time decay response of a wide range of metal targets at typical mine depths (about 15 cm). A small antenna is disclosed for small metal targets and a large antenna for large metal targets. Both antenna are multi-turn inductive loop antennas for adequate time decay measurement sensitivity. Experimental examination and analysis of time decay data from many medium and large metal targets using any of the two antennas indicate that data collection should preferably start at least 10 to 20 $\mu$s after transmitter system 102 shutoff.

When current is switched off in an inductor it takes a finite amount of time for the currents to decay to zero. Large multi-turn transmitter coils tend to have high inductance and when current is switched off their long decay time currents tend to mask induced target decay currents. The technique according to the present invention used to minimize the effects of slowly decaying currents in the transmitter coil 116 involves placing the first receiver coil 124 over an unknown metal object 200. The second receiver coil 128 sets over soil 202 that does not contain metal. The first receiver coil 124 measures the time decay of the metal target 200, time decay of the soil 202, and transmitter coil decay currents. The second receiver coil 128 measures the time decay of the soil 202 and transmitter coil decay currents. The differential amplifier 134 subtracts the two coil signals, and the result is an output of just the metal target decay signal.

The separation distance between the two receiver coils 124, 128 is an important design parameter. Ideally, the magnetic flux from the target 200 should link only with the first receiver coil 124 directly above it. Flux linkage with the second receiver coil 128 should preferably be minimized. For extended source targets (those represented by large metal mines and UXO targets), the separation of the two receiver coils 124, 128 is important. If the two receiver coils 124, 128 and the large target are viewed as forming a loosely coupled transformer, it is easily seen that the mutual inductance of the target and the second balance receiver coil 128 should be minimized. The easiest method to achieve this result is to physically separate the two receiver coils 124, 128.

Experiments showed that if the receiver coil was made approximately the size of the largest target of interest, the two receiver coils should be separated at least one receiver coil diameter apart. This rule-of-thumb was developed during ETD antenna development and appeared to work for extended targets to depths of about 20 cm. To reduce the coupling effect further, subsequent antenna designs had smaller diameter receiver coils and separation distances at least two or more receiver coil diameters apart.

As a target-to-antenna distance R increases relative to the differential receiver coil separation distance D, the differential receiver coil arrangement looses its effectiveness. To understand this effect, consider a simple target modeled as a point source dipole directly under the first receiver coil 124 at distance $R_1$. The signal seen by the first receiver coil 124 is approximately proportional to $R_1^{-3}$ and the signal seen by the second receiver coil 128 is approximately proportional to $R_2^{-3} (D^2+R_1^2)^{-3/2}$. As the distance from the target to the plane of the receiver coils 124, 128 increases, $R_1$ becomes large relative to D and $R_2$ approaches $R_1$. The field strengths seen by both receiver coils 124, 128 become nearly equal. The differential arrangement of the two receiver coils 124, 128 then tends to cancel the signal seen by both receiver coils 124, 128.

The balanced receiver coil technique works well for minimizing the transmitter decay current and offers two additional benefits: transmitter induced ground eddy current signal cancellation and far-field noise cancellation. For large metal targets, the ground eddy current signal is not a source of significant interference. However, as the target size becomes smaller, the ground eddy current signal becomes more important. The balanced receiver coil configuration of the present invention tends to minimize the effect of the ground and allows the antenna to operate close to highly conductive and magnetic soils.

Additionally, the balanced receiver coil arrangement tends to cancel the electrical noise generated from near-by electrical equipment. The receiver coils 124, 128 can pick up electrical noise sources, but the electrical noise does not saturate the wide band differential low-noise amplifier 134. With ensemble averaging, the antenna can function in an environment having power line and equipment noise.

FIG. 3A illustrates the design of the antenna developed for the ETD sensor system 100. The antenna is designated generally by reference numeral 200. The receiver coils 124, 128 are simple inductive loop antennas. It is contemplated that the receiver coils 124, 128 can be designed with different parameters to improve or change performance based on applications. It is also contemplated that these coils 124, 128 can be replaced with one or more of other known magnetic field sensors (e.g., magnetoresistor, fiber-optic magnetometer, Hall-effect, and fluxgate).

Table 1 shows measurements for reference letters A–D shown in FIG. 3A and the number of loop turns for preferred embodiments of the transmitter coil 116 and receiver coils 124, 128.

TABLE 1

Physical dimensions of the small and large antennas.

| Antenna | A (cm) | B (cm) | C (cm) | D (cm) | Transmitter Loop Turns | Receiver Loop Turns |
|---|---|---|---|---|---|---|
| Small | 60 | 10 | 20 | 21 | 8 | 16 |
| Large | 100 | 15 | 27 | 58 | 6 | 16 |

Table 2 shows antenna electrical parameters for the preferred embodiments of the transmitter coil 116 and the receiver coils 124, 128 for the small and large antennas. $F_r$ is the resonance frequency.

TABLE 2

Measured antenna electrical parameters for transmitter and receiver coils.

| | Resistance | Inductance | Capacitance | Resonance Freq. ($F_r$) |
|---|---|---|---|---|
| Small transmitter coil | 1.8 Ω | 69 $\mu$H | 240 pF | 1.1 MHz |
| Small receiver coil | 4.5 Ω | 50 $\mu$H | 197 pF | 1.6 MHz |
| Large transmitter coil | 2.2 Ω | 60 $\mu$H | 382 pF | 1.1 MHz |
| Large receiver coil | 2.1 Ω | 27 $\mu$H | 555 pF | 1.3 MHz |

The balanced receiver coil design from small metal and void detection can be better understood by referring to FIGS.

3B–3D. In all three figures, the broad, upward pointing arrows represent the eddy current target response. The size of the arrows represent the relative amplitudes of the response. FIG. 3B shows the case where there is no target but soil. Assuming that the two receiver coils 124, 128 are perfectly balanced, and the soil is homogeneous and contains no metal parts, the two receiver coils 124, 128 "see" the same soil eddy current response. The differential amplifier 134 subtracts the two nominally identical signals $R_1$, $R_2$ and there is a zero output from the amplifier 134.

FIG. 3C shows what happens when a metal target 202 is under one receiver coil 124. The response of the metal target 202 is larger than the soil response and when the differential amplifier 134 subtracts the two signals $R_1$, $R_2$, there is a positive output from the amplifier 134.

FIG. 3D shows the void effect. Here, the void 204 is the decrease or absence of a soil decay response under one of the receiver coils 124, 128. When the signals $R_1$, $R_2$ from the two coils 124, 128 is differenced by the differential amplifier 134, the output of the amplifier 134 is less than zero. The response becomes more complex when a void and metal are measured together.

For the case of detecting underground voids and metal targets, the response outputted by the differential amplifier 134 is the superposition of the two signals $R_1$, $R_2$. In addition, the signal response of both the metal and void objects is dependent on the exact configuration of the antenna and the sensor/target orientation (i.e., target burial depth). The antenna configuration dictates the spatial distribution of the magnetic field and the depth of the target determines the amount of soil overburden.

To document the performance of the small and large antennas, several calibration targets were constructed from a single turn of thin copper wire. These calibration targets have a time decay response that can be calculated analytically from theory. The calibration target's time decay response was then measured with the two antennas and compared to the theoretical response.

FIG. 4 shows a sample time decay response from the different calibration loops for the small antenna. The diameter of the calibration loops were made large (about 8.5 cm) so that the effective dipole moments of the loops gave a high signal-to-noise ratio at the receiver system 104. A nonlinear least-squares method was used to fit the time decay response data to a single exponential-term equation. FIG. 4 shows that the curve-fitted data (time decay parameter) and calculated decay times are exact for the small antenna up 1.4 μs. Similar results were obtained for the large antenna, but with a reduced time response of about 2 μs. The results of the time constant calibration gives confidence that the antennas are measuring accurate target time decay responses.

II. Time Decay Response Measurements Using the ETD Sensor System

A. Data Presentation

A particular metal target's time decay response is unique, thereby allowing for target identification and classification by the processing unit 146 or other computing device provided with the data acquired by the ETD sensor system 100 of the present invention. One data presentation method to show a target's uniqueness is to plot the data graphically as a function of time. The primary objective of presenting data in this manner is to show the distinct nature of a target's response compared to other targets. The time decay response is an inherent property of the target; once excited by the magnetic field from the antenna's transmitter coil 116, the target's magnetic field decays uniformly in space.

In some cases, in FIGS. 5–11, in order to show more clearly the differences in the relative time decay rates of targets with large differences in absolute amplitude responses, the time decay data amplitudes have been normalized to one at some convenient time. For the cases of small metal target, the amplitude information is important to show relative signal strength, and for those cases the data are not normalized.

B. Large Metal Target Data

Target tests in the experimental studies disclosed herein using the inventive ETD sensor system 100 were conducted at the U.S. Army's indoor mine lanes at Ft. Belvoir, Va. and at Ft. A. P. Hill, Va. Data were collected from a wide variety of metal test targets. The tests were conducted in air using steel and nonferrous plates and rings from 10 to 30 cm in diameter, common clutter targets, such as soda and paint cans, hand tools, typical battle field clutter and large metal mines. For the over 100 targets studied, the time decay response data showed that different metal targets had unique time decay response signatures.

Figure 5:
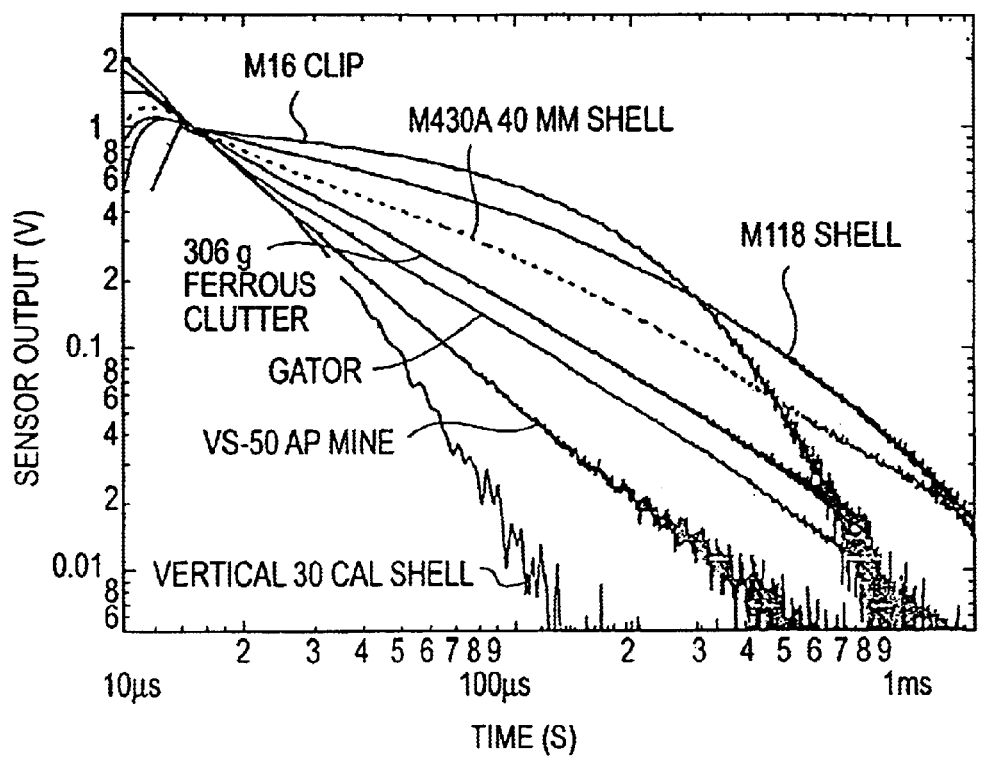
FIG. 5 is a chart showing time decay responses of various medium and large metal targets measured by a large antenna of the ETD sensor system.

FIG. 5 shows sample time decay response data (normalized at 15 μs) from various medium and large metal targets measured by the large ETD antenna FIG. 5 shows data from targets common in a battlefield environment: a cartridge clip from an M16 rifle, various mortar and gun shell casings, a large undefined ferrous clutter object, a VS50 anti-personnel (AP) mine, and an air-deployed U.S. Army Gator anti-tank (AT) mine without its MS plates. The targets were measured in air at various distances from and at various orientations (vertical and horizontal) to the sensor antenna. In all cases, signal processing of the data was not needed to differentiate the different targets. A visual examination of the time decay plots was sufficient for discrimination. Signal processing of the data provides for automatic target recognition (ATR) without operator interaction.

Tests were also conducted to investigate the effects of different soil types on large metal target time decay responses. When compared to measurements made in air, no significant differences were found in the time decay responses for large metal targets buried in dry gravel, sand, or clay soils. However, small time decay response differences were found in the highly magnetic soil used in one of the indoor mine lanes at Ft. Belvoir. In order to estimate the magnetic soil effect, time decay response data from two different metal AT mines (TM46 and FFV028) were compared to data taken in dry clay and magnetic sand. The comparison was made by parameterizing the time decay curves using a single exponential curve fit over a time window from 300 to 800 μs. Over this time widow the goodness of fit parameter $\chi^2$ was approximately $10^{-3}$. The time decay fit parameter for the two different soil types and two different mines differed by approximately 2 to 5%.

One interesting result of these metal mine tests was that mines with very similar construction (material, size and shape) showed measurable differences in their time decay responses. Although these differences can be seen in a plot of time decay data, the subtle time decay features can more clearly be seen if the general time decay trend is removed from the data. The TM46 AT mine was selected as a reference time decay signal. After normalizing all target responses at 50 μs, the time decay response of the TM46 AT mine was subtracted from the other large metal targets.

Figure 6:
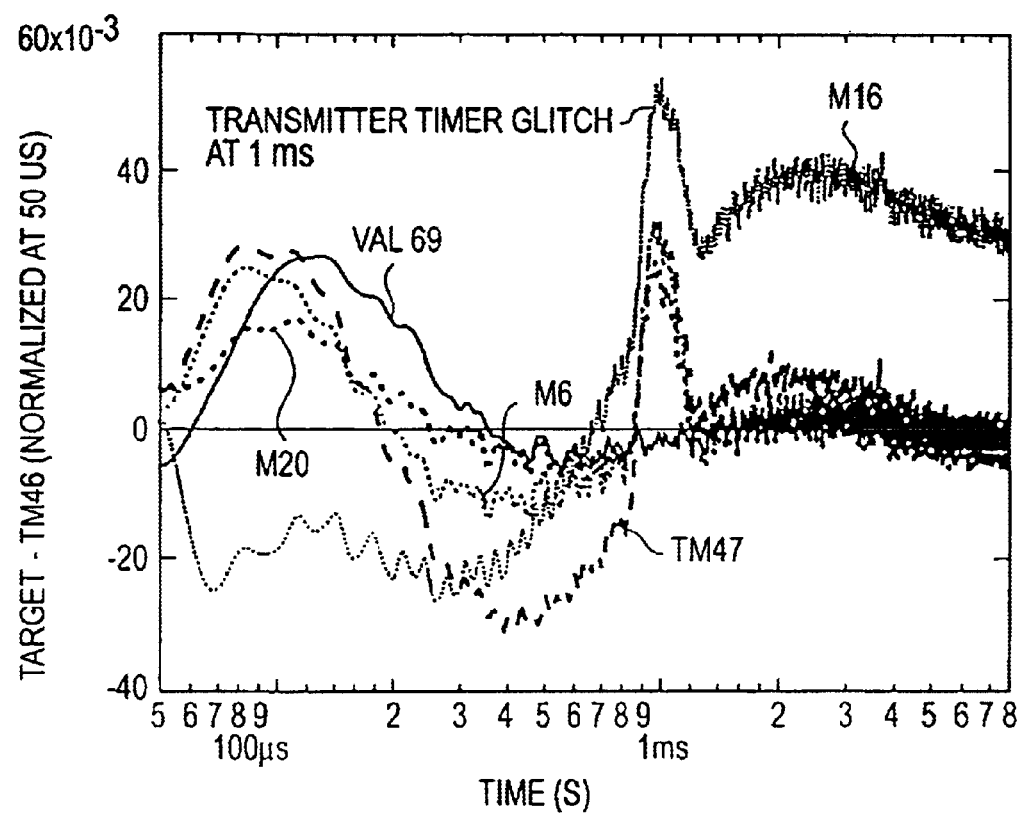
FIG. 6 is a chart showing time decay responses of various AT metal mines measured by the ETD sensor system.

The time decay differences are shown in FIG. 6. The plot clearly shows subtle but measurable differences between large metal AT mines. The figure also shows a sensor glitch at about 1 ms caused by the transmitter timer signal coupling into the receiver system 104. The problem was traced to a broken ground wire in the transmitter cable shield.

C. Metal and Void Data

Figure 7A:
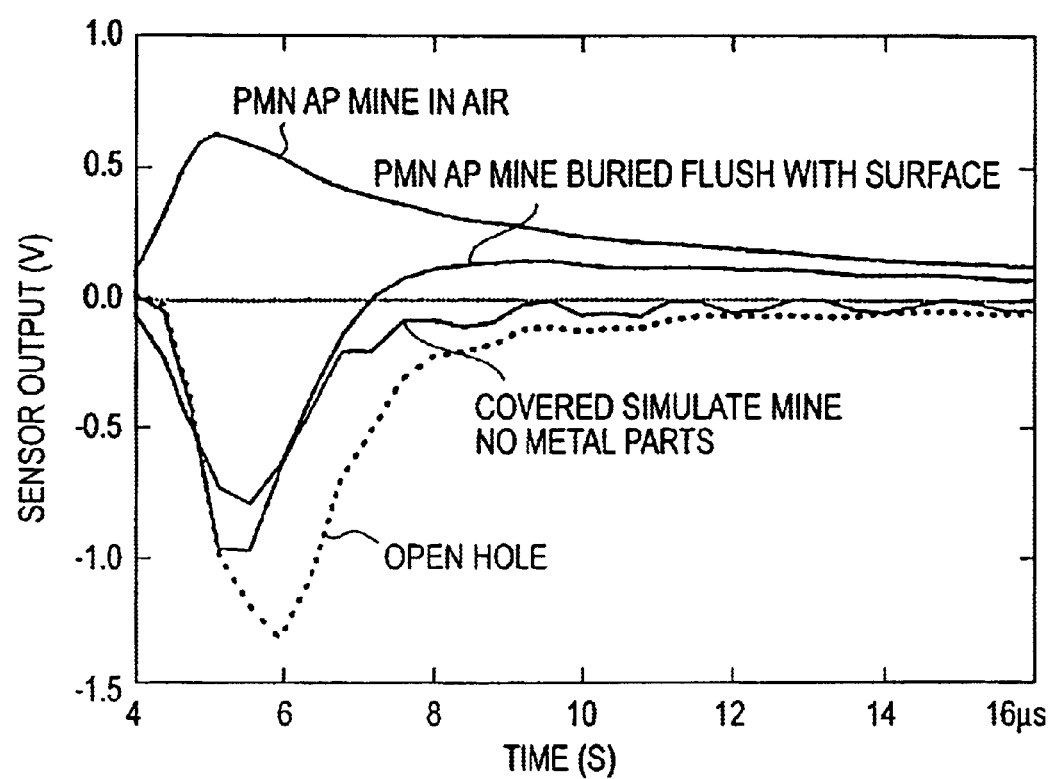
FIG. 7A is a chart showing time decay responses of various targets buried in magnetic soil measured by the ETD sensor system.

FIG. 7A shows results from experiments of test targets in magnetic sand. The experiments were conducted at the Ft. Belvoir mine lanes in magnetic sand. FIG. 7 shows time decay responses from four different test configurations: a decommissioned nonmetallic-cased Russian PMN AP mine (11-cm diameter, 5.6-cm height; with about 40 g of interior ferrous and nonferrous metal components) in air, a hole in the sand, a simulated plastic mine with no metal parts buried in the sand, and the PMN AP mine buried in the sand. The following measurements were taken with the antenna centered over the test area approximately 5 cm above the sand surface:

1. The time decay response of the PMN mine sitting on the surface of the magnetic sand (in air). The time decay signal starts out positive and decays to zero. The differential receiver coil arrangement of the ETD sensor system 100 cancels the sand's time decay response. This shows the ability of the inventive sensor to operate in soil conditions with high magnetic/conductive properties.

2. A hole approximately 12 cm deep and 12 cm in diameter was dug in the magnetic sand. The time decay response of the hole was measured. Because of the differential geometry of the ETD sensor system's antenna, the hole or void creates an amplitude response opposite that of the metal (in this case negative). Note the time scale of this response: the sand's time decay response occurs primarily in the less than 10-$\mu$s region. Also, the amplitude response of the hole is fairly large (approximately 1.3 V maximum amplitude) and goes from negative to zero amplitude. The large voltage signal from the sensor was repeatable and indicates that the negative response was not a sensor or background subtraction artifact.

3. Next, a simulated plastic mine (approximate size of the PMN mine) was placed in the hole and covered with about 1 cm of magnetic sand. Its time decay response was measured and showed a small reduction in amplitude compared to the hole by itself. The simulated mine's response also varies from negative amplitude to zero.

4. Finally, the PMN mine was buried in the magnetic sand, with the top of the mine approximately 1 cm below the surface. Its time decay response can be divided into two regions. In the time region just after transmitter turn-off where the hole time decay response dominates, the sensor measures the hole or void created by the relatively large volume of displaced magnetic sand. The second time region (after about 8 $\mu$s) is dominated by the time decay response from the mine's metal parts.

Additional laboratory tests with simulated mines in wet and dry topsoil showed results that were similar to those shown in FIG. 7A, but with greatly reduced signal amplitude: A void signal with a coincident metal signature.

To illustrate the void response signal in a different soil type with a long decay response time a large test box was constructed and filled with topsoil. The soil was allowed to dry for several weeks before measurements were taken. The soil appeared to be composed of weathered igneous rock particles containing mica, magnetite, etc. The specific resistivity of the dry soil was about 400–600 M-Ohm/cm, measured with sheet brass electrodes of 2.5 cm$^2$ area, 2.5 cm apart.

Figure 7B:
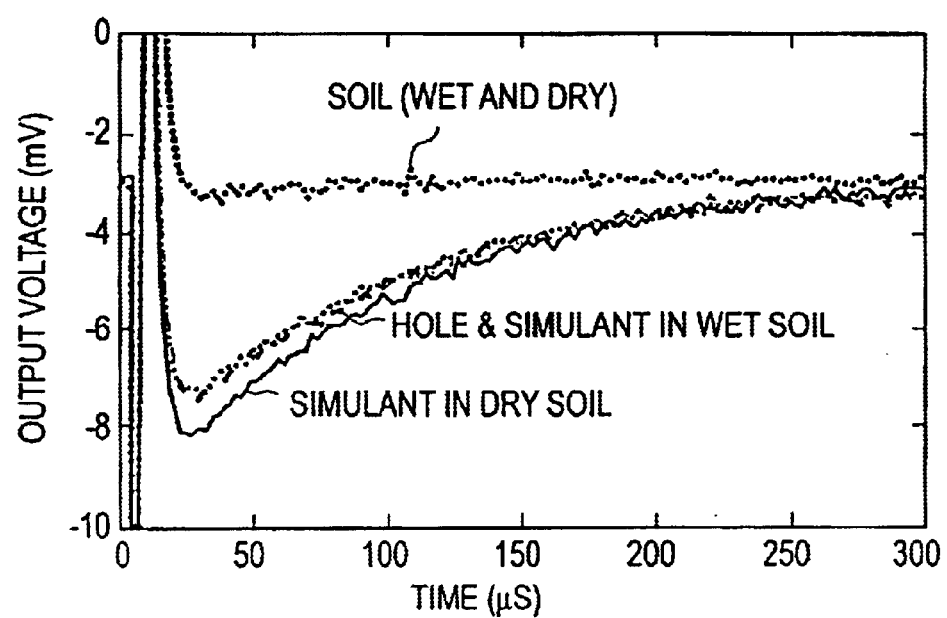
FIG. 7B is a chart showing void response signals of various soil types measured by the ETD sensor system.

FIG. 7B documents the decay responses from four tests: (1) no target; (2) a 12 cm diameter hole in moist soil; (3) a 12 cm diameter AT mine simulant with no metal parts in moist soil; and (4) a 12 cm diameter AT mine simulant with no metal parts in dry soil. The amount of water added to the soil to make it moist was just enough for the soil to clump together. During these tests, the background was not subtracted from the data. The 3 mV offset (most likely due to amplifier DC bias) shown in FIG. 7B is one consequence of not subtracting the background.

FIG. 7B clearly shows a small (8 mV peak), but discernable, void signature from the hole and simulant targets. The measurement of the soil response with no target shows a flat response after about 30 $\mu$s. The void target responses peak around 30 $\mu$s and decay slowly to zero around 300 $\mu$s.

Except for the small differences in the amplitude, the dry and wet soil responses appear to be almost identical. The amplitude differences could be due to slight differences in antenna/target orientation between the different tests. It is theorized that the bulk soil properties dominate the decay response and that the small amounts of water added to the soil did not affect the eddy current decay.

D. Low-Metal Target Data

A test with buried low-metal content (LMC) AP and AT mines under field conditions was conducted on the calibration lanes at the Pilot Test Site for the UXO Center of Excellence for Testing located at Ft. A. P. Hill, Va. The two primary objectives of this test were: 1) ascertain whether the laboratory void results with simulated LMC mines could be confirmed under field conditions with real LMC mines, and 2) to collect and compare data from clutter and LMC AP and AT mines.

Figure 8:
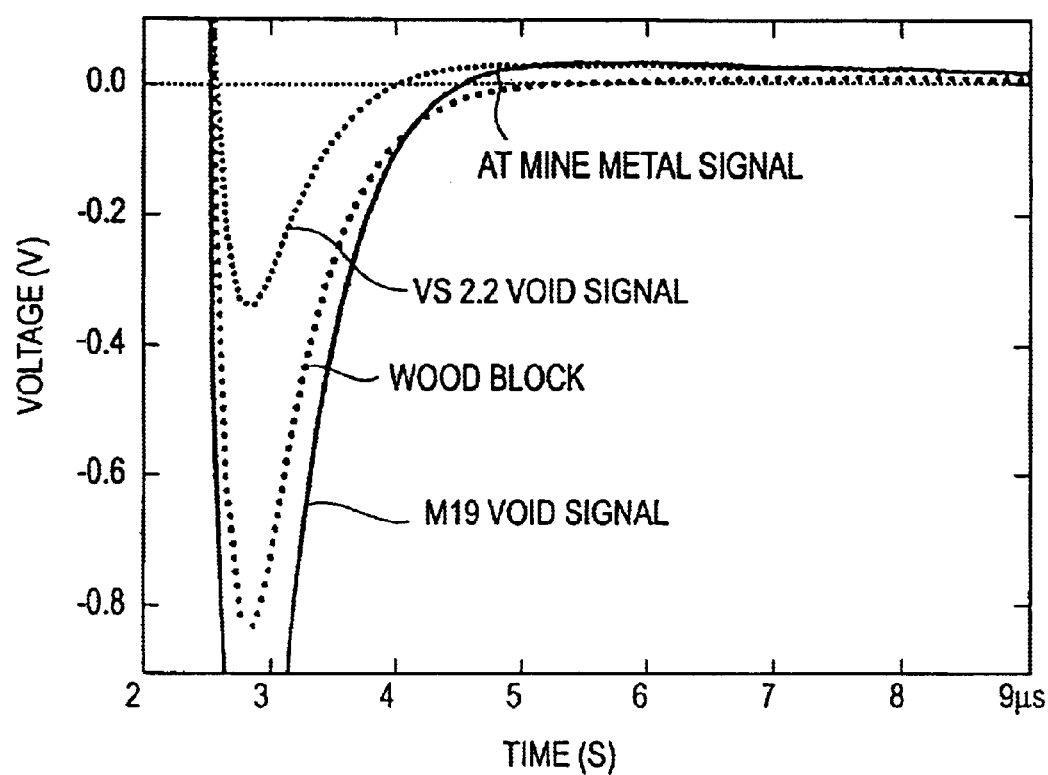
FIG. 8 is a chart showing time decay responses of a block of wood and two low-metal content AT mines measured by the small antenna of the ETD sensor system.

The coincident void/metal results discussed in Section II.C were confirmed during this test. As an example, FIG. 8 shows a plot of the time decay response from a block of wood, and two LMC AT mines (M19 and VS 2.2). The targets were buried in the same soil type (sandy loam) and data were collected with the small EDT antenna centered about 4 cm above the ground.

In FIG. 8, a void signal is clearly evident in the plot from each target. However, a small but discernable metal signal is present from the M19 and VS 2.2 AT mines due to their metal components. The void response of the wood target decays to zero and never indicates a metal signature (positive voltage). These results appear to confirm the earlier test results with the PMN mine in the magnetic sand and show that under certain soil conditions and with some mine types, a nonmetallic-cased mine with metal content potentially may be identified by its void and coincident metal signature.

Figure 9:
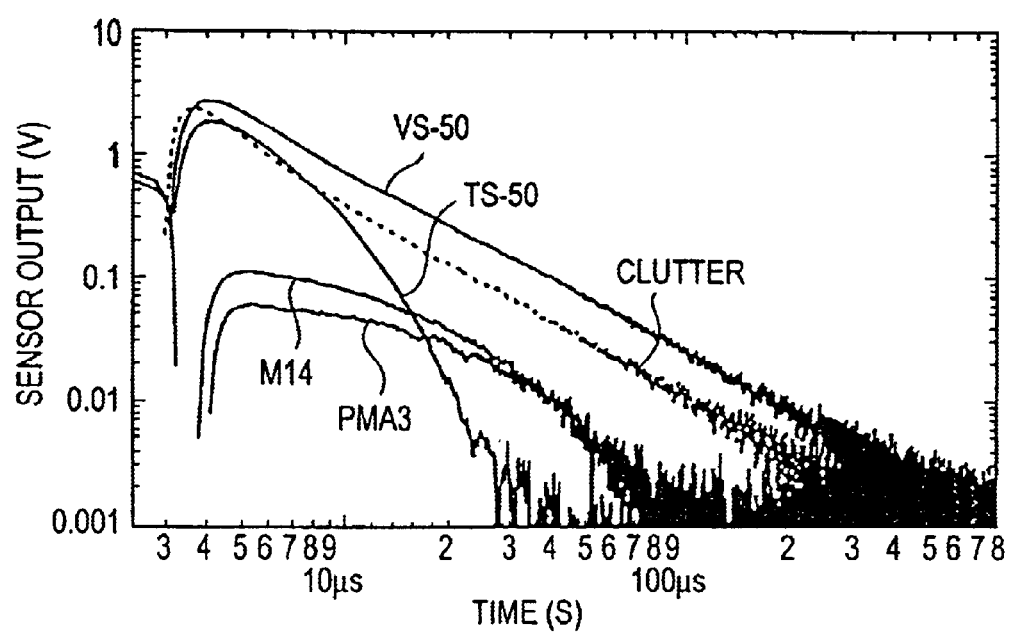
FIG. 9 is a log-log chart showing time decay responses of four AP mines and a ferrous clutter target measured by the small antenna of the ETD sensor system.

FIG. 9 shows a log-log plot of time decay data for four AP mines and a ferrous clutter target measured by the small ETD antenna centered 4 cm above the ground. Table 3 lists the target parameters, burial depths and estimates of time decays using a single exponential fit to the data over the time window 7 to 50 $\mu$s.

TABLE 3

Target parameters, burial depths and estimates of time decays.

| Target | Size: mm Diameter × Height | Metal Weight/ Type g | Burial Depth cm | Time Constant $\mu$s |
|---|---|---|---|---|
| VS-50 | 90 × 45 | 18: ferrous | 5 | 6.5 |
| Clutter | Unknown | 16: ferrous | 3 | 5.8 |
| TS-50 | 90 × 45 | 4.4: non-ferrous | Surface | 3.2 |
| M14 | 56 × 40 | 0.6: non-ferrous | 0.6 | 13 |
| PMA3 | 111 × 40 | 0.35: non-ferrous | Surface | 19 |

The plots of FIG. 9 show that the M14 and PMA3 AP mines have different time decay response curves. Note also that the M14 and PMA3 appear to have a small void effect component in the time period between 3 and 4 $\mu$s where the response curves dip toward negative response. The VS50 AP mine is easily detected via its 18-g steel blast-effect disk. The steel disk is used to enhance its lethality at the expense of detectibility. The VS50 (time decay estimate: 6.5 $\mu$s) and the 16-g ferrous clutter (time decay estimate: 5.8 $\mu$s) present very similar time decay responses making discrimination on this parameter alone difficult. The TS50 AP mine has a relatively large amplitude response but decays very rapidly (time decay estimate: 3.2 µs). Because of the fast decay time, this mine is very difficult to detect with a conventional EMI metal detector.

FIG. 10 explores the time decay response of the M14 AP mine in more detail. FIG. 10 compares the time decay response of a M14 in air and buried in soil with the response of two small steel metal clutter targets. The data were measured by the small ETD antenna centered 4 cm above the ground. The most obvious feature to note is the dissimilar time decay responses of the in air and buried M14 mines during the early part of the time decay. The in air and buried time decays appear to merge in the late time region (after about 20 µs). It is theorized that the differences in the early time response is due to the void effect created by the M14 in the soil. In the late time region, the response of the ground has decayed to a small value and has minimal effect on the remaining portion of the M14's time decay.

FIG. 10 also compares the M14 to two small ferrous metal clutter objects with metal weights similar to the M14's metal content. The clutter objects are bare metal parts of different shape found during the test range preparation and replaced in the ground at a known depth. The first item to note in the figure is that the ferrous clutter objects have very different time decay responses compared to the M14 mine. This would be expected since the M14, like most LMC mines, uses small amounts of both ferrous (e.g., firing pin) and nonferrous (e.g., firing pin support cup) metal components. Also note that even though the two ferrous clutter targets have approximately the same metal weight, they have different time decay responses. A third item to note is the metal clutter appears to have no void response compared to the buried M14 AP mine (i.e., a dip in the response voltage around 3–4 µs).

FIG. 11 compares the small and large ETD antennas over the same buried PMA3 AP mine. The data have been normalized at 15 µs to show that the two antennas are measuring the same time decay response in the time region beyond 15 µs. However, the two antennas give different responses in the time region between approximately 5 and 10 µs. The differences may be due to the way the two antennas respond to the void effect or an artifact of the slower frequency response of the large antenna relative to the small antenna.

Another possible explanation may be due to the relative sizes of the two transmitter coils. We note that the large transmitter coil excites a much larger volume of soil compared to the small transmitter coil. The resulting eddy currents from the soil cause a larger imbalance in the two receiver coils of the large antenna relative to the small antenna. The large antenna receiver coils may see the void more clearly, possibly because of the increased volume of soil excited by the larger transmitter coil.

FIGS. 5–11 clearly indicate that the ETD time-domain sensor system 100 of the present invention has sufficient bandwidth and sensitivity to measure the time decay response of large metal objects and LMC AP and AT landmines buried at typical burial depths. Time decay responses from targets with metal content from more than 3000 g to less than 1 g were demonstrated. The ETD sensor system 100 demonstrated the ability to measure metal target decay times starting approximately 3 to 5 µs after the transmitter current is turned off and target decay time constants as short as 1.4 µs.

Laboratory and field tests indicated that medium and large metal content mines have unique time decay response characteristics that allows them to be discriminated from a wide variety of typical metal clutter in a variety of soil types. As FIG. 6 indicates, large metal targets have many complex structural features that manifest themselves in different time decay characteristics. At least for non-magnetic soils, the soil decay response appears to have little influence on an EMI sensor. For medium and large metal targets, highly magnetic soils appear to have minimal impact on the target's decay response (less than 5%).

One of the issues highlighted in FIGS. 7 and 10 is the fact that the time decay response of a mine is modified by the soil response. The measured response is a superposition of the target's metal component response and the response of the soil. The small and large antenna comparison in FIG. 11 shows that this superposition of responses is dependent on the antenna configuration.

In addition, because, in most cases, the soil effects are not known in advance, the time decay character of a LMC mine may be masked by the unknown soil response. The soil's effect on an LMC mine's decay response makes it difficult to develop a robust, universal library of object signatures for LMC mines.

However, as discussed above, the ETD sensor system 100 of the present invention has the ability to measure both the metal and the void signature of LMC mines in some soil types. The existence of a coincident void and metal signal enabled the development of a robust LMC mine classification/discrimination scheme. That is, the time decay response characteristics of voids for various known LMC mines and targets in known soils, e.g., magnetic and non-magnetic soils, are stored within the object signature library. These characteristics are then used to identify LMC mines and targets, thus making the object signature library a universal library of target signatures for LMC mines.

As discussed below with reference to FIG. 12, the ETD sensor system 100 of the present invention has the ability to acquire data for developing a robust, universal library of object signatures for low and medium to large metal content mines, as well as underground voids. Using the library, a low or a medium to large metal content target's time decay response (or void's time decay response) is compared with the library of time decay responses.

A time decay response closely approximating the low or medium to large metal content target's time decay response (or void's time decay response) is identified using the library. The low or medium to large metal content target is then determined to be composed primarily or entirely of the metal corresponding to the identified time decay response. The low or medium to large metal content target can also be identified using the library. Further, characteristics of a detected void can be identified using the library as well.

III. Data Collection Algorithm

An algorithm for collecting data using the ETD sensor system 100 of the present invention is illustrated by the flow chart of FIG. 12. The EDT sensor system 100 is operated as a conventional metal/void detector in the search mode (a low-power mode) when searching for mines or other visually obscured/buried objects (see FIG. 14A). During the search mode, the ETD sensor system operating parameters are fixed to predetermined values.

Figure 14B:
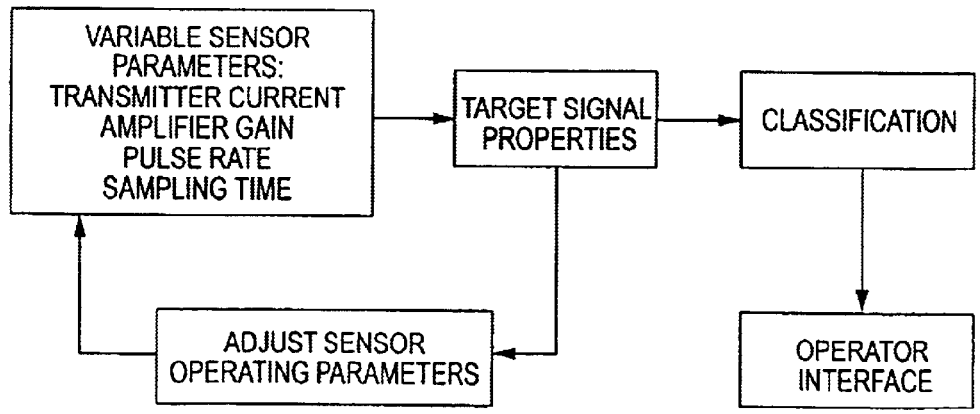
FIG. 14B is a block diagram of an identification mode of the ETD sensor system.

Once a target of interest has been detected, the operator is informed via the operator interface, e.g., the display 148 of the computer control system 108, and the EDT sensor system 100 is switched to target identification mode (see FIG. 14B). In this mode, the ETD sensor system operating parameters are optimized for target characteristics/classification. The identification mode also powers the computer control system 108 to analyze the time decay response signal of the target of interest. The system 100 switches to the identification mode either automatically or manually.

A. Overview

In brief, the data collection algorithm involve five steps: setting data collection parameters of the antenna (i.e., the transmitter pulse rate (TPR), the data sample window (DSW), the digitizer sample rate (DSR), etc.); switching to an identification mode when the antenna is placed over an unknown object; performing data acquisition; saving data to the storage medium; and repeating the whole procedure and collecting a background reading. Background data are collected over an area that is nearby but is known to not have a metal target.

During data analysis, the background data is subtracted from the target data. This procedure removes any amplifier offset voltage drift and any residue decay currents from the transmitter coil 116 that are coupled into the receiver coils 124, 128. For medium and large targets, the background data subtraction procedure produces minimal differences in time decay response curves, because the antenna's drift and the residue currents in the transmitter coil 116 are orders of magnitude below the target's time decay response voltage. However, for small targets, at decay times close to the transmitter shut off time, the background data subtraction procedure improves the quality of the data With continued reference to FIG. 12, after multiple data sets have been acquired, the data is analyzed by a classification algorithm, including a void detection algorithm for low metal content targets, in an effort to determine characteristics of the target's time decay response and/or to detect voids. The determined characteristics are then compared to an object signature library having a database of various time decay response and void characteristics. Characteristics stored in the library which closely match the determined characteristics are flagged and used to identify the type of metal target.

B. Detailed Discussion

The data collection algorithms will now be described in greater detail.

1. Antenna Parameter Optimization in Identification Mode

Data presented in this report and the scientific literature has shown that target decay responses (i.e., signatures) have a wide dynamic range in both signal amplitude and decay time. The range of amplitudes and times are many orders of magnitude. In general, a small metal target has a small amplitude signal and a fast decay time. In general, a large metal target has a large amplitude signal and a long decay time. For target identification, the target signature must be measured over a wide range of amplitudes and time that are appropriate for the target.

These wide ranging signatures cannot be measured optimally by a sensor with fixed operating parameters. An antenna or sensor with fixed operating parameters designed for small targets detection will saturate its amplifiers when a large target is detected. A saturated amplifier gives no time decay information, and hence, the target can not be identified or classified. Likewise, when an antenna is operating at a high repetition rate so that the search for a target can be done quickly, when a large target is detected, the decay time of the large target exceeds the time interval dictated by the repetition rate. As an example, conventional metal detectors operate with typical repetition rates as high as 1000 cycle per sec (Hz). Assuming for purposes of illustration, a 50% duty cycle square wave or ramp, this gives a time interval for target decay of 500 $\mu$s.

Data in FIG. 5 clearly show that for a large number of metal targets, the decay time is longer than 500 $\mu$s. Signals from large metal landmines and even larger UXO (e.g., 500 lb. bombs) can persist for many milliseconds. For accurate target classification, research has shown that the wider the range of decay measurements from a target, the better the performance (higher probability of correct classification) of the classification algorithm. Taking the same metal detector example and applying it to small target classification we note that small targets, in the range of low-metal plastic-cased landmines, have decay signatures that persist only for about 100 $\mu$s (e.g., M14 and PMA3 antipersonnel mines). Having a sensor collect data for 500 $\mu$s when there is no signal is a waste of sensor resources (e.g., power) and slows down the search rate.

As illustrated above, for optimum EDT sensor system performance, the EDT sensor system parameters must be adjusted for the type of target detected. Large and small targets require different EDT sensor system operating parameters. The algorithm shown in FIG. 12 illustrates the general approach. In the search mode, the EDT sensor system operating parameters are set for maximum to enhance the probability of detection: amplifier gain maximum (typical value: 10000); transmitter pulse rate (TPR) (typical value: 10 KHz); data sample rate (DSR) (AD converter sample rate, typical value: 10 Msamples/s) and data sample window (DSW) (typical value: 50 $\mu$s).

Once an object has been detected, the Identification Mode is selected. The operator places the sensor over the unknown target. Exact placement of the antenna over the target location is not critical in a time-domain sensor of the present invention. Operators would use conventional target localization procedures to find the maximum signal strength of the unknown target and place the center of the first receiver coil 124 over that spot The second receiver coil 128 would be over an area not having a signal.

The computer would adjust ETD sensor system operating parameters: TPR to 5 KHz and DSW to 100 $\mu$s. One sample of data would then be collected and tested for amplifier saturation.

If the signal was saturated, then the amplifier gain of the programmable amplifier 143 and/or transmitter current would be lowered and another data sample would be collected and tested. This would continue until the amplifier gain of the programmable amplifier 143 or transmitter current had been adjusted so that the target signal was not in saturation.

If the signal was not saturated, then the next step is performed. The target's time decay response signal is evaluated to estimate the decay time constant (TC) of the signal. The time decay estimate is used to adjust the sensor timing parameters, e.g., TPR, duty cycle, DSW and DSR. Generally, a target with an exponential decay time constant of TC will have no signal after about five time constants. Therefore, the sensor timing parameters could be adjusted so that the DSW covers the 5*TC time. The TPR, duty cycle and DSR are then adjusted to be compatible with the DSW. Assuming the sensor is operating with 50% duty cycle, then DSW and TPR can be written as: DSW=5*TC and TPR=2*DSW.

Research has shown that about 1000 data points collected in the DSW provides good signal fidelity (higher number of data points allows the sensor to do a better job of averaging). Therefore, DSR of the AD converter 144 can be written: DSR=[DSW*1000]$^{-1}$ samples/s.

The above calculation of the TPR, DSW and DSR based on the target's estimated time constant decay could be implemented as-is for a highly flexible EDT sensor system 100. However, it is sometimes more cost effective and lowers EDT sensor system 100 complexity to use the above estimated EDT sensor system parameters to select predetermined EDT sensor system parameters. Therefore, when a DSW of 80 $\mu$s is found to be a good value, the EDT sensor system 100 would actually set the DSW to 100 $\mu$s. When a DSW of 180 $\mu$s is found to be a good value, the EDT sensor system 100 would actually set the DSW to 200 $\mu$s.

We have found that the minimum DSW is typically 100 $\mu$s and that having DSW grow by octaves is a reasonable compromise over sensor cost and complexity. Therefore, when DSW is calculated, the value is used to select a predetermined set of EDT sensor system operating parameters. Using predetermined operating EDT sensor system parameters is also needed to develop the library of known targets. Decay responses of known targets of interest (i.e., mines and UXO) are measured with these predetermined EDT sensor system parameters.

Data Collection

Once the ETD sensor system operating parameters have been adjusted for target decay parameters, the inventive algorithm illustrated by FIG. 12 instructs the data collection process to collect multiple data sets and average them to obtain a high signal-to-noise ratio (SNR) signal, i.e., an average data set for the target.

Typically, the number of data sets that have to be averaged is dependent on the signal strength. For low level signals (i.e., those that have the sensor operating with high gain and high transmitter current) require a high number of data averages. Typically, this can be as high as 1000 data sets averaged. For large target signals, those with low amplifier gain and low transmitter current, the number of data samples can be low. Typically, 1 to 10 data sets.

Using the amplifier gain and transmitter settings, a lookup-table can be generated to establish the number of data sets to be averaged. Another method to establish the number of data sets to be averaged would have the algorithm to dynamically calculate the noise in the decay time signal. When the noise level reaches a plateau, then no more data averages would be taken.

The target data has now been collected with nominally optimized EDT sensor system parameters. The operator is told via the operator interface, to move the antenna to an area adjacent to the target area and collect background data sets. These data sets are collected with the same EDT sensor system parameters as the target. The background data sets are then averaged to obtain an SNR signal, i.e., an average background data set.

The average target and background data sets are then subtracted and the data are sent to the Signal Processing and Classification Algorithm subroutine and the Target Response Sorting subroutine.

2. Signal Processing and Classification

Signal processing include filtering and normalization. The filter is applied to the signal with the proper filter type and parameters based on the ETD sensor system operating parameters. For example, if the data were collected at a fast DSR, the filters would use parameters that would preserve the high bandwidth of the signal. If the signal was collected with a slow DSR, the filters would use parameters that would remove high frequency noise components. One schooled in the art could readily implement the proper filtering scheme based on EDT sensor system data collection parameters.

Normalization of the target decay response is performed after filtering. The time decay response is an inherent property of the target; once excited by the magnetic impulse from the antenna's transmitter coil 116, the target's magnetic field decays uniformly in space. The amplitude of an unknown target's decay response is dependent on the target orientation and depth.

Since the unknown target's depth is not generally known, the absolute amplitude of the time decay response cannot by itself be used for target classification. The time decay nature of the target's response, not the absolute amplitude, governs the target characterization process. In order to facilitate the classification process and be able to compare the unknown target's decay response to a library of known target decay responses, the time decay data amplitudes have been normalized to 1 at some convenient time. The normalization time is selected based on the DSW parameter. For example, the DSW of 100 $\mu$s, the amplitude of the unknown target would be normalized to one at 10 $\mu$s. A look-up table is generated based on the DSW parameter.

Classification of a target uses a conventional match-filter algorithm or comparable classification algorithm, such as one based on Bayesian statistical estimation theory and the target's absolute signal response amplitude. One schooled in the art could implement the classification algorithm using the normalized target response and amplitude data provided by the inventive algorithm.

The target's normalized decay response and absolute amplitude are compared to a library of known targets of interest. The library is preferably composed of targets that are a threat, such as mines or UXO, and/or targets that are common clutter targets, such as cans, nails, bolts, etc. It is provided that the EDT sensor system operating parameters that were used to collect the unknown target response data must match the library's target data collection parameters.

In addition to the time decay response classification based on metal signals, the classifier also looks for void signatures. These signatures are negative compared to the metal signatures and as such the algorithm scans for portions of the time decay response signal going below zero volts. If a void signature and a metal signature are both found in the same decay signal, the probability that the target is a low-metal mine is very high.

It has been found experimentally by the present inventors that there are some cases where the unknown target's normalized time decay response matches a target of interest, but is not the correct target. This is particularly true for very small targets. In this case, the absolute amplitude of the target response can be used to help classify the target. For example, a threat target, such as a low-metal plastic mine has a range of burial depths. Therefore, there is a minimum and maximum sensor-to-target range. This defines a minimum and maximum amplitude range that a target response can have.

Consider the case where the unknown target has a time decay response that is statistically identical to a known mine. However, the absolute amplitude of the unknown target has a voltage level that is greater than the mine's voltage level at a minimum sensor to target range. The unknown target cannot be the mine since one of the mine's unique characteristics is its maximum signal response to the EDT sensor system 100 (based on EDT sensor system operating parameters). The same approach applies when the signal level from the unknown target falls below the minimum signal level of a known threat target.

The target classification is passed to the operator interface. The classification can take the form of threat/non-threat or exact target identification. A level of confidence is also assigned to the classification process and the operator makes the judgment as to the level of threat and the proper course of action.

3. Target Signature Library

The target signature (time decay response) library is a database that contains normalized decay responses from targets of interest. Targets of interest include threat targets, such as mine and UXO, and common clutter items, such as soda cans and common battlefield clutter (e.g., spent cartridges and shell casing). Amplitude range data are stored along with time decay signatures and EDT sensor system operating parameters.

The library could have the ability to update the database in the field so that new threat or non threat targets could be added. It is contemplated that the library is updated in real-time.

3. Target Response Sorting

The target response sorting subroutine sorts target response by type of response. This extra data collection process expands selected portions of the time decay response in order to resolve difficult target signatures.

If the target is determined to be a small, i.e., a fast decay time target, the algorithm branches to the void/metal detection subroutine. If the target is determined to be a medium or a large target, i.e., a slow decay time target, the algorithm branches to the medium/large target data collection subroutine.

5. Coincident Void/Metal Detection

The algorithm of the present invention looks for two signals which have incompatible EDT sensor system operating parameters: a void signal that typically requires high bandwidth and a small metal signal that requires high sensitivity at a lower bandwidth. Background measurements and subtraction are understood in this data collection.

Small amplitude, fast decay time targets are typical of low-metal content land mines and deserve special attention. Since the inventive sensor system can detect voids (soil type dependent) and the coincident metal signature from low-metal content land mines, the EDT sensor system operating parameters are optimized for void detection and the detection of small metal signals that have low SNR.

The following method also works with high SNR metal signals with coincident void signals, but the more typical case is void and low SNR metal signal. Detection of voids in fast decaying targets generally occurs in the time region of less than 10 $\mu$s.

As shown in FIG. 8, a void signal (negative voltage) shortly after the transmitter turn-off and a metal signal (positive voltage) later in the decay response indicate that a low-metal content mine in present. The inventive algorithm is implemented to look for a negative signal in the target decay response data.

First, the EDT sensor system operating parameters are changed to reflect the fast decay times of the void. The EDT sensor system 100 is optimized for the void signal, a void signal measurement is taken, and the data is examined for the presence of a void.

In low conductive soil, void detection requires high bandwidth and the ability of the EDT sensor system 100 to operate very close to the transmitter turn-off time, since this is the time region when void signals dominate. Since the detection process is interested in data in the time region immediately after transmitter turn-off, the inventive algorithm decreases the DSW parameter to about 30 $\mu$s. The TPR parameter is increased to reflect the new DSW. Since we are now operating at a very high TPR, many data sets can be averages in a very short time to increase SNR.

To measure target decay responses close to the transmitter turnoff time, the transmitter current or the number of transmitter or receiver coil turns are reduced. The former is accomplished by having the computer control system 108 change the transmitter current. The later is accomplished by having multiple transmitter and/or receiver coils to select from.

Reduced transmitter current case: the easiest to implement and construct is to reduce the transmitter current. The reduced transmitter current reduces the voltage induced in the receiver coils 124, 128. The reduced voltage in the receiver coils 124, 128 results in the receiver amplifiers not saturating or coming out of saturation at a time close to the transmitter turn-off time. Some of the lost antenna sensitivity can be made up by using a time-gain amplifier, where the gain of the circuit is increased after the initial transmitter pulse has decayed to zero.

Another way to measure the target signal close to the transmitter turn-off time is to increase the bandwidth of the antenna by increasing the bandwidth of the transmitter and receiver coils. To do this, one would construct a transmitter or receiver with multiple sets of turns that could be selected by the computer control system 108. Remembering that high bandwidth circuits require low inductance and capacitance, for high bandwidth transmitter or receiver, a low number of coil turns would be selected. Remember, inductance scales as $N^2$, where N is the number of turns of the coil.

In addition to increasing the bandwidth of the antenna by decreasing the coil turns of either the transmitter or receiver coils, the reduced number of coils reduces the transmitter/receiver coupling, and thus reduces the voltage levels. As above, the reduced voltage levels allow the receiver amplifiers to come out of saturation at an earlier time.

After the void signal is examined, the EDT sensor system operating parameters are changed to collect high sensitivity (e.g., amplifier gain and transmitter current is increased to maximum), low metal signal data. The detection process looks for the presence of a small signal of a metal object. In many cases, the metal signal does not have a high SNR to classify the metal type as a mine.

However, instead of measuring the time decay of the target directly, the inventive algorithm measures an integrated signal from the antenna, looking for an indication of a metal signal. If the integrated response is positive then a metal signal is present. A digital integrating algorithm is implemented to accomplish this.

For the case of the metal signal detection, the antenna's sensitivity is increased in the time region of greater than 10 $\mu$s. The antenna is still operating at a DSW of 30 $\mu$s, but now the signal is integrated from 10 to 30 $\mu$s and the algorithm looks for the positive signal that indicates a metal signal.

At this point the EDT sensor system 100 has been instructed to set operating parameters and collect data for the detection of a void and a metal signal. The results are: coincident void/metal detected: high probability unknown target is a low-metal mine; void only detected: high probability that unknown target is a non-mine clutter object, such as a piece of wood; and metal detected: probability that unknown target is clutter or deeply buried low metal content mine.

The above EDT sensor system results are passed to the signal processing and classification subroutine. Information from this data collection is combined with time decay data to form a decision on target classification.

Medium/Large Target Data Collection

Medium or large sized metal targets have many complex structural features that manifest themselves in different time decay characteristics. These complex features are characterized by multiple exponential terms is Equation (1) and give rise to a target decay signature with a very large dynamic range in both time and amplitude. The first pass through the data collection process, described above, collects target data with EDT sensor system operating parameters adjusted for optimal target data collection starting at a minimum time after the transmitter turns off.

The start time of the measurement is typically in the range of 1 to 20 $\mu$s. Because of the wide dynamic range of the target's signature, collecting data with one set of optimal EDT sensor system operating parameters, starting at a minimum time, will not collect all of the data that can be extracted from the target for target classification, before the EDT sensor system 100 reaches its noise floor with a SNR too low for meaningful target classification. Therefore, this subroutine adjusts the EDT sensor system data collection parameters to collect target signatures over a second time interval.

FIG. 13 illustrates the concept of multiple, overlapping data collections from a target with a complex time decay response that has many orders of dynamic range in both time and amplitude. Shown in FIG. 13 is a theoretical time decay response from a metal target with complex structure features that give rise to the time decay response being characterized by multiple time constants as given in Equation (1).

FIG. 13 shows what the EDT sensor system 100 would measure if it had seven orders of magnitude of voltage sensitivity and 5 orders of magnitude of time range. A target such as a 500 lb bomb with steel body and aluminum tail fins would have this type of signature. The steel body has a relatively short time decay signal with high amplitude and the aluminum fins would have a longer time decay signal with lower amplitude. The combined time decay signal would span many decades of time and many orders of magnitude in measured receiver output.

Even with averaging, EDT sensor system and environmental noise typically limit the dynamic range of measurements to approximately three to four orders of magnitude (1000–10000). As an example, data shown in FIG. 9 for a VS-50 medium content mine shows that the signal level ranges from about 0.001 to 3 volts in the time range of 3 μs to 800 μs. The SNR becomes very low below about 0.005 volts and 200 μs, i.e., the EDT sensor system 100 has reached its noise floor. For effective target classification, a high SNR is needed. Research reported in the scientific literature has indicated that an SNR of about 6 to 10 dB is needed for accurate target classification.

Even in the absence of EDT sensor system and environmental noise issues as described above, it is difficult to construct an inexpensive wide dynamic range AD converter that has both fast digitations and wide input amplitude range. Typical fast sampling, low-cost AD converters are in the 10 to 12-bit range (i.e., digitize analog signals 1 part in 1024 to 1 part in 4096). For a low-cost system, one would want to use low-cost parts.

The medium/large target data collection subroutine adjusts the EDT sensor system operating parameters to overcome the above limitations of EDT sensor system cost, noise and dynamic range. As illustrated in FIG. 13, the concept of the DSW is used, but now one allows the operating system to move the start time of the DSW to a later time after the transmitter turn off. This is shown in FIG. 13 as Data Sample Window 2 (DSW2).

Data Sample Window 1 (DSW1) measures the target signature in the range of $10^{-6}$ to $10^{-3}$ seconds. DSW2 overlaps DSW1 and measures the target signature in the range of $10^{-4}$ to $10^{-1}$ seconds. With an overlap in DSW, the entire time decay response can accurately be reconstructed for target classification purposes. The EDT sensor system operating parameters TPR, DSR, amplifier gain, and transmitter current are adjusted for this new DSW. For the case illustrated, the TPR would be approximately 5 Hz, and DSR would be approximately 100 Ksamples/s. The current in the transmitter would be increased until the receiver amplifier just saturates the amplifiers at the beginning of DSW2.

If the maximum value of the transmitter current is reached before the receiver amplifier saturation occurs, then the receiver amplifier gain is increased until this condition is met or until the maximum amplifier gain is reached. For the case illustrated in FIG. 13, the total gain in the EDT sensor system 100 due to increasing the transmitter current and/or the amplifier gain is about 100.

The information gathered by the medium/large target data collection subroutine is passed to the signal processing and classification subroutine. Information from this data collection is combined with time decay data from DSW1 to form a decision on target classification.

8. Operator Monitor and Alarms

This section of the algorithm communicates with the EDT sensor operator. It provides information to the operator, such as when a target is detected, when to take target and background measurements, and house keeping functions, such as built-in test and low sensor battery indicator. Both audio and visual indicators can be activated via the operator interface.

IV. Features and Advantages

The ETD sensor system 100 disclosed herein provides several features and advantages:

Automatic Ground Balancing: The antenna design accounts for soil effects directly and passively without requiring additional electronic means or adjustments, as prior art antennas and sensors. As a result, the following benefits are realized: (1) the ETD sensor system 100 removes the eddy current effects from the soil (ground) in the decay response characteristics of medium and large metal mines and UXOs; (2) the system 100 separates the eddy current effects from the soil (ground) in the decay response characteristics of low metal content (LMC) mines; (3) the system 100 can detect small metal objects in the presence of highly conductive or magnetic soil; (4) the system 100 can work in salt water to detect and classify metal objects in the water column or buried in the ground underwater; and (5) the system 100 can detect voids in magnetic/conductive soil as discussed below with respect to the detection of LMC landmines.

Automatic Transmitter Coil Balancing: The transmitter coil 116 forms an inductor. If the inductor has currently flowing in it, there is energy stored in the magnetic field of the inductor. When the current in an inductor is switched off or changed rapidly, it takes a finite amount of time for the energy in the magnetic field to dissipate and small residual transmitter currents to decay to zero. A TD EMI type sensor detects small target induced currents during the time period after the transmitter is turned off. In a conventional TD EMI sensor, measurements of the target's time decay must wait until the transmitter residual currents decay to zero (or sufficiently small relative to target's eddy currents). Prior art methods to control current in the transmitter coil cause the sensor to have a slow response relative to the present invention. The transmitter and dual receiver coil arrangements of the present invention account for the transmitter system's decay currents directly and passively without additional electronic means or adjustments, such as with computer control. The transmitter decay currents are subtracted automatically in the differential amplifier 134 or via counter-wound receiver coils (similar differential techniques known in the art can be implemented for different magnetic field sensors).

Within the limits of mechanical and electrical balancing of the transmitter coil 116 and receiver coils 124, 128, the following benefits are realized:

Measurement of the time decay response of an object can be started much sooner after the transmitter system is turned off as compared to a conventional TD EMI sensor. The sooner this measurement occurs, the "faster" the response of the antenna. Two benefits are:

First, a fast responding antenna can measure objects with low metal content (small metal objects), since low metal content objects tend to have fast decay times. An object's time decay is roughly proportional to the size and weight of the object. A small object has a small time constant As shown in Equation (1), a small time constant means that the object's response signal decays to zero in a short amount of time. A slow responding antenna (e.g., an antenna that has to wait for the transmitter currents to decay to zero before taking a response measurement) is highly likely to miss a small object's decay signal.

Second, a faster responding antenna can detect objects that are farther (i.e., deeper in the ground). Since an object's time response decays exponentially, the sooner an antenna starts measuring the decay response, the higher the detected signal. Thus, the sensor system of the present invention is more sensitive for both small and large metal objects than a conventional TD EMI sensor.

It is contemplated that since the transmitter decay currents are nulled by the unique antenna arrangement of the present invention, the size and number of turns of the transmitter system 102 can be more easily tailored for the application. In other words, the ETD sensor system 100 can be scaled to fit the application.

The following cases illustrate the tailoring of the antenna to fit the particular application the ETD sensor system 100 is being used for:

Case 1: Large antenna for large and deep objects (e.g., large metal mines and UXOs) can use a large size transmitter coil with many turns. The large coil dimensions project a magnetic field deep into the ground, thus increasing the EDT sensor system's sensitivity in depth. A large number of coil turns increase the size of the magnetic field for a given transmitter coil current, thus increasing the EDT sensor system's sensitivity even further. Since the large metal targets have relatively long decay times, the EDT sensor system's time response can be made longer and still be able to measure the time decay of the object under study.

Case 2: Small antenna for small and shallow objects (e.g., plastic landmines) can use a small size transmitter coil with many turns. The small coil dimension projects an intense magnetic field close to the antenna thus increasing the EDT sensor system's sensitivity for shallow objects. The large number of transmitter coil turns increase the size of the magnetic field for a given coil current, thus increasing the EDT sensor system's sensitivity for low metal content even further.

Case 3: The EDT sensor system 100 can be mounted on a moving vehicle. The benefits of the EDT sensor system 100 can be realized and at the same time the search rate of the antenna can be greatly improved. The advantage of the automatic noise cancellation works for removing the electrical noise of the vehicle. Also the balanced differential receiver design cancels the effect of nearby metal parts common in a vehicle.

Case 4: The EDT sensor system 100 can be configured as a barrier sensor for detection of metal objects (e.g., metal weapons) at points of entry to critical areas, such as airports or banks. The target identification and discrimination ability of the EDT sensor system 100 has many advantages over existing metal detectors. The balanced differential receiver design cancels the effect of nearby metal parts and far field electrical noise commonly found in buildings, thus allowing for increased sensitivity.

Far-field Electromagnetic (EM) Noise Cancellation. For antenna testing and calibration purposes, it is desirable for the metal detection sensor system 100 to be able to operate in a conventional laboratory environment with minimum modifications to the EM environment. In addition, it is desirable for the ETD sensor system 100 to operate in and around electromagnetically noisy environments, such as those close to conventional power lines. The differential arrangement of the dual receiver allows for the receiver coils 124, 128 to cancel the effects of EM noise from noise sources that are relatively far away from the ETD sensor system 100. Although all EM noise is not cancelled with the differential arrangement of the present invention, the level of noise cancellation is such that the receiver system's electronic amplifiers are not overloaded. After initial amplification, the receiver system's signal is filtered using conventional digital signal processing techniques known in the art.

Far-field Metal Object Cancellation. For antenna testing and calibration purposes, it is desirable for the metal detection sensor system 100 to be able to operate in a conventional laboratory environment with minimum modifications to the building's construction. The differential arrangement of the dual receiver allows for the receiver coils 124, 128 to cancel the effects of far-field metal objects that are relatively far away from the ETD sensor system 100. The exact distance to the local metal object is a function of the dual receiver separation distance. An explanation of this is as follows:

As a target-to-antenna distance R increases relative to the differential receiver coil separation distance D, the differential receiver coil arrangement looses its effectiveness. To understand this effect, consider a simple target modeled as a point source dipole directly under the first receiver coil 124 at distance $R_1$. The signal seen by receiver coil 124 is proportional to $R_1^{-3}$ and the signal seen by second receiver coil 128 is proportional to $R_2^{-3} = (D^2 + R_1^2)^{-3/2}$. As the distance from the target to the plane of the receiver coils 124, 128 increases, $R_1$ becomes large relative to D and $R_2$ approaches $R_1$: The field strength seen by both receiver coils 124, 128 becomes nearly equal. The differential arrangement of the two coils 124, 128 then tends to cancel the signal. Thus, far field metal objects are not "seen" by the ETD sensor system 100 of the present invention.

Single Point Measurement: The ground balancing and soil response cancellation features are disclosed in the prior art. However, the prior art discloses that the antenna needs to be moved back and forth by the operator and that the operator must make judgment calls as to the nature of the spatial response of the antenna. This is particularly true for void detection using a prior art FD-type sensor system. The present invention detects the void directly from the time decay signature of the object. The operator does not need to move the antenna back and forth over the object.

Low-Cost Antenna Design: The antenna design discussed above has the benefit of making the antenna electronics relatively less complex and costly compared to prior art. The receiver signals are amplified by low-cost, low-noise, wide bandwidth amplifiers. The use of a TD approach to excite the target removes the need for complex mechanical antenna configurations. The use of a TD approach to excite the target removes the need for complex excitation of the transmitting antenna. A pulsed TD method generates a wide bandwidth excitation of the object via a simple electronic switch that has few components. Typical FD techniques that use multiple frequency spectrum approaches for object identification require the generation of complex frequencies over a large frequency range. These frequencies must then be amplified with a power amplifier before passing the signals to the transmitter coil. High frequency, wide bandwidth response, low distortion power amplifiers are more complex and relatively more expensive compared to a TD excitation source.

What has been described herein is merely illustrative of the application of the principles of the present invention. For example, the functions described above and implemented as the best mode for operating the present invention are for illustration purposes only. Other arrangements and methods may be implemented by those skilled in the art without departing from the scope and spirit of this invention.

What is claimed is:

1. An algorithm for optimizing target characterization of a visually obscured object upon detection of said visually obscured object by a metal detector sensor system having a transmitter and a receiver, said algorithm comprising the steps of:

a. adjusting a first parameter of said metal detector sensor system and collecting a data set using the receiver;

b. analyzing the collected data set to determine at least one measurement of a time decay response corresponding to the object; and c. adjusting a second parameter of said metal detector sensor system, collecting a data set using the receiver, and returning to step (b), if the determined at least one measurement is outside a predetermined range.

2. The algorithm according to claim 1, further comprising the steps of:

d. estimating a decay time response constant corresponding to the object; and e. adjusting at least the first parameter based on the estimated decay time response constant.

3. The algorithm according to claim 2, wherein step (e) includes adjusting a transmitter pulse rate, a data sample window, and a digitizer sample rate of said detector based on the estimated decay time response constant, where the transmitter pulse rate is the first parameter.

4. The algorithm according to claim 2, further comprising the steps of:

f. collecting a plurality of data sets, including an object data set corresponding to the object and background data sets corresponding to non-object areas, using the receiver;

g. averaging the background data sets to obtain an average background data set; and h. subtracting the average background data set from the object data set.

5. The algorithm according to claim 4, further comprising the steps of:

i. determining a characteristic of the object's time decay response;

j. adjusting at least the second parameter and returning to step (f), if the characteristic is less than a predetermined threshold; and k. adjusting at least the second parameter and returning to step (f), if the characteristic is greater than the predetermined threshold.

6. The algorithm according to claim 5, wherein the second parameter of said metal detector sensor system is a transmitter current of said sensor system.

7. The algorithm according to claim 5, wherein step (k) further includes adjusting at least the first parameter of said metal detector sensor system.

8. The algorithm according to claim 7, wherein step (k) includes adjusting a transmitter pulse rate, a data sample window, and a digitizer sample rate of said metal detector sensor system, where the transmitter pulse rate is the first parameter.

9. The algorithm according to claim 5, further comprising the step of classifying the visually obscured object, said step comprising the steps of:

l. comparing the object's time decay response with a library of normalized time decay responses each corresponding to an object;

m. identifying a time decay response from the library approximating the object's time decay response; and n. determining the visually obscured object to be the object corresponding to the identified time decay response.

10. The algorithm according to claim 9, further comprising the step of appending the library by storing the object's time decay response within the library with a corresponding description of the object.

11. The algorithm according to claim 10, wherein the library is appended in real-time.

12. The algorithm according to claim 1, wherein the first parameter of said detector is a transmitter pulse rate.

13. The algorithm according to claim 12, wherein step (a) adjusts the transmitter pulse rate to approximately 5 kHz.

14. The algorithm according to claim 1, further comprising the step of adjusting a data sample window of said detector to approximately 100 $\mu s$ upon detection of said visually obscured object.

15. The algorithm according to claim 1, wherein the at least one measurement includes a saturation and a voltage measurement of the time decay response corresponding to the object.

* * * * *